(12) United States Patent
Kelm et al.

(10) Patent No.: US 6,796,159 B2
(45) Date of Patent: Sep. 28, 2004

(54) LOW CONTACT FORCE SPRING

(75) Inventors: Henry J. Kelm, Litchfield, OH (US); Steven J. Reilly, Westlake, OH (US); Walter Santee, Mentor, OH (US)

(73) Assignee: Barnes Group Inc., Bristol, CT (US)

( * ) Notice: Subject to any disclaimer, the term of this patent is extended or adjusted under 35 U.S.C. 154(b) by 2 days.

(21) Appl. No.: 10/007,076

(22) Filed: Nov. 5, 2001

(65) Prior Publication Data

US 2002/0152790 A1 Oct. 24, 2002

Related U.S. Application Data

(63) Continuation-in-part of application No. 09/351,529, filed on Jul. 12, 1999, now Pat. No. 6,322,059, and a continuation-in-part of application No. 09/121,544, filed on Jul. 23, 1998, now abandoned.

(51) Int. Cl.[7] .............................................. B21D 24/08
(52) U.S. Cl. ...................................... 72/351; 72/453.13
(58) Field of Search ...................... 72/351, 350, 453.13

(56) References Cited

U.S. PATENT DOCUMENTS

| 1,034,115 A | 7/1912 | Johnson |
| 1,613,961 A | 1/1927 | Schwartz |
| 1,664,486 A | 4/1928 | Rode |
| 1,805,521 A | 5/1931 | Hansen |
| 2,976,845 A | 3/1961 | Goldring |
| 3,326,546 A | 6/1967 | Otto |
| 3,490,757 A | 1/1970 | Haanes ........................... 267/1 |
| 3,589,702 A | 6/1971 | Spieth ........................... 267/64 |
| 3,740,997 A | 6/1973 | Blake et al. ................... 72/465 |
| 3,806,105 A | 4/1974 | Knoishi et al. ............. 267/116 |
| 3,865,356 A | 2/1975 | Wössner ...................... 267/139 |
| 3,869,861 A | 3/1975 | Case ............................ 60/413 |
| 3,913,460 A | 10/1975 | Wright ........................... 92/85 |
| 3,923,294 A | 12/1975 | Gold et al. .................. 267/119 |
| 3,947,006 A | 3/1976 | Bauer et al. ................. 267/120 |
| 4,111,030 A | 9/1978 | Shepard et al. ............... 72/351 |
| 4,153,237 A | 5/1979 | Supalla ......................... 267/64 |
| 4,257,254 A | 3/1981 | Adamus et al. ............... 72/432 |
| 4,341,137 A | 7/1982 | Leitch et al. ................. 83/639 |
| 4,342,448 A | 8/1982 | Wallis .......................... 267/119 |
| 4,419,804 A | 12/1983 | Axthammer ................. 29/434 |
| 4,423,859 A | 1/1984 | Muller ......................... 267/119 |

(List continued on next page.)

FOREIGN PATENT DOCUMENTS

| DE | 2638929 A1 | 3/1978 |
| DE | 3813021 A1 | 11/1989 |
| EP | 0458467 A2 | 11/1991 |
| GB | 2075395 A | 11/1981 |
| SE | 9401119.4 | 3/1994 |
| WO | WO9527157 | 10/1995 |
| WO | WO9949237 | 9/1999 |

OTHER PUBLICATIONS

Publication entitled: *Tanker®2*, Nitrogen Gas Springs, A & B Series, Teledyne Fluid Systems Products, Technology That Grows with You™, pp. 3–29, Copyright 1996.
Article entitled: *Hylene®PPDI*, 10 pages, Dated May 28, 1999, from www.dupont.com, Copyright 1997.

*Primary Examiner*—Lowell A. Larson
(74) *Attorney, Agent, or Firm*—Fay, Sharpe, Fagan, Minnich & McKee, LLP

(57) ABSTRACT

A fluid spring assembly. The spring assembly preferably includes a body that slidably supports a piston that is attached to a piston rod. The piston serves to define a fluid chamber within the body that is charged with a pressurized fluid medium. The piston is retained within the body by a rigid retainer member. A biasing member is provided between the retaining member and the piston for resisting the force generated by the fluid medium within the fluid chamber.

66 Claims, 22 Drawing Sheets

U.S. PATENT DOCUMENTS

| | | | | |
|---|---|---|---|---|
| 4,428,566 | A | 1/1984 | de Baan et al. | 267/64.15 |
| 4,445,671 | A | 5/1984 | Reuschenbach et al. | 267/64.12 |
| 4,499,750 | A | 2/1985 | Gerber et al. | 72/351 |
| 4,550,899 | A | 11/1985 | Holley | 267/119 |
| 4,583,722 | A | 4/1986 | Wallis | 267/119 |
| 4,601,461 | A | 7/1986 | Brough et al. | 267/64.15 |
| 4,628,796 | A | 12/1986 | Wallis | 92/117 |
| 4,635,908 | A | 1/1987 | Ludwig | 267/64.11 |
| 4,647,026 | A | 3/1987 | Siemann et al. | 267/64.15 |
| 4,657,228 | A | 4/1987 | Lautzenhiser | 267/64.15 |
| 4,691,902 | A | 9/1987 | Kadis | 267/119 |
| 4,729,300 | A | 3/1988 | Klein | 100/43 |
| 4,765,227 | A | 8/1988 | Balazs et al. | 91/417 |
| 4,792,128 | A | 12/1988 | Holley | 267/118 |
| 4,796,871 | A | 1/1989 | Bauer et al. | 267/64.11 |
| 4,823,922 | A | 4/1989 | Ergun | 188/322.15 |
| 4,838,527 | A | 6/1989 | Holley | 267/64.28 |
| 5,003,807 | A | 4/1991 | Terrell et al. | 72/351 |
| 5,007,276 | A | 4/1991 | Kadis et al. | 72/351 |
| 5,027,637 | A | 7/1991 | Umetsu | 72/453.13 |
| 5,042,253 | A | 8/1991 | Kataoka | 60/560 |
| 5,076,451 | A | 12/1991 | Conley et al. | 213/43 |
| 5,129,635 | A | 7/1992 | Holley | 267/129 |
| 5,275,387 | A | 1/1994 | Cotter et al. | 267/64.11 |
| 5,511,868 | A | 4/1996 | Eftefield | 305/31 |
| 5,528,918 | A | 6/1996 | Kirii | 72/15.1 |
| 5,660,379 | A | 8/1997 | Oest | 267/126 |
| 5,687,598 | A | 11/1997 | Kirii et al. | 72/21.5 |
| 5,827,155 | A | 10/1998 | Jensen et al. | 482/54 |
| 6,059,273 | A | 5/2000 | Sand et al. | 267/64.25 |
| 6,068,245 | A | 5/2000 | Roper | 267/64.15 |
| 6,103,852 | A | 8/2000 | Shirasaka | 528/80 |
| 6,170,809 | B1 | 1/2001 | Cotter | 267/119 |

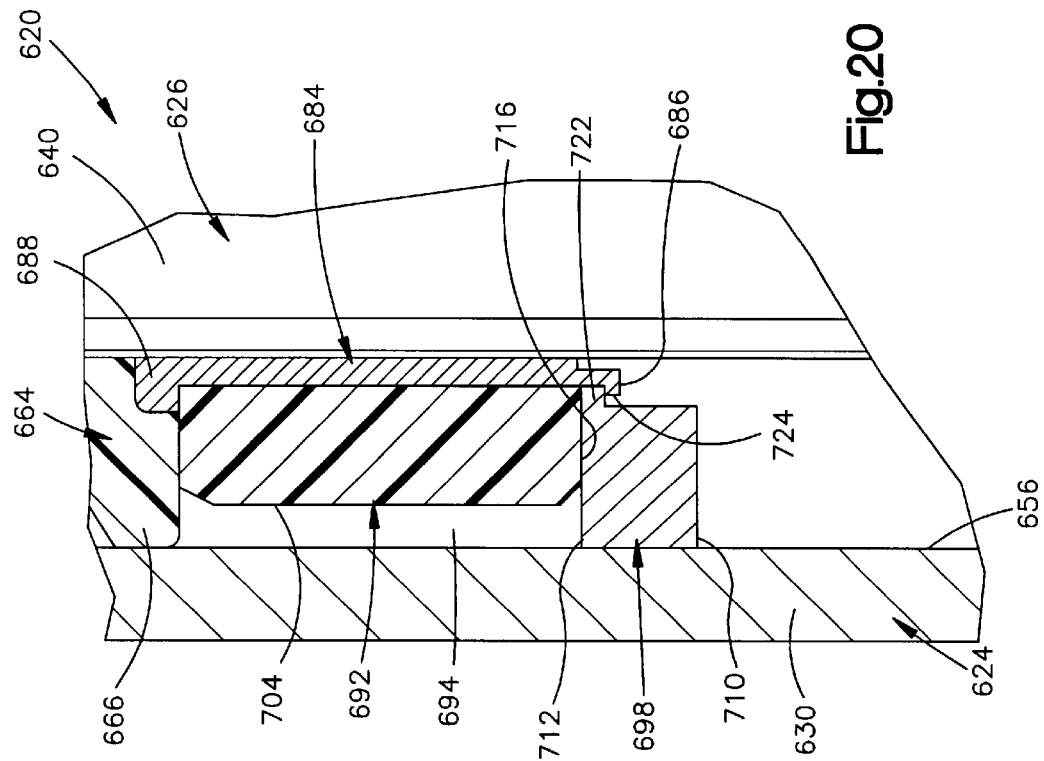
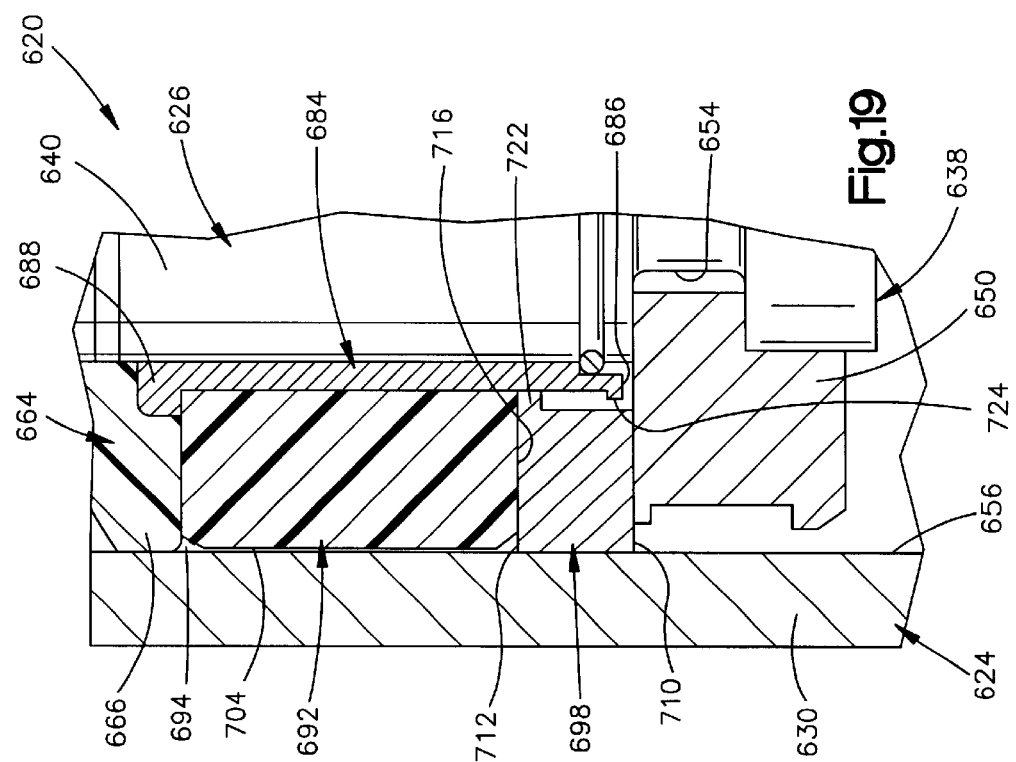

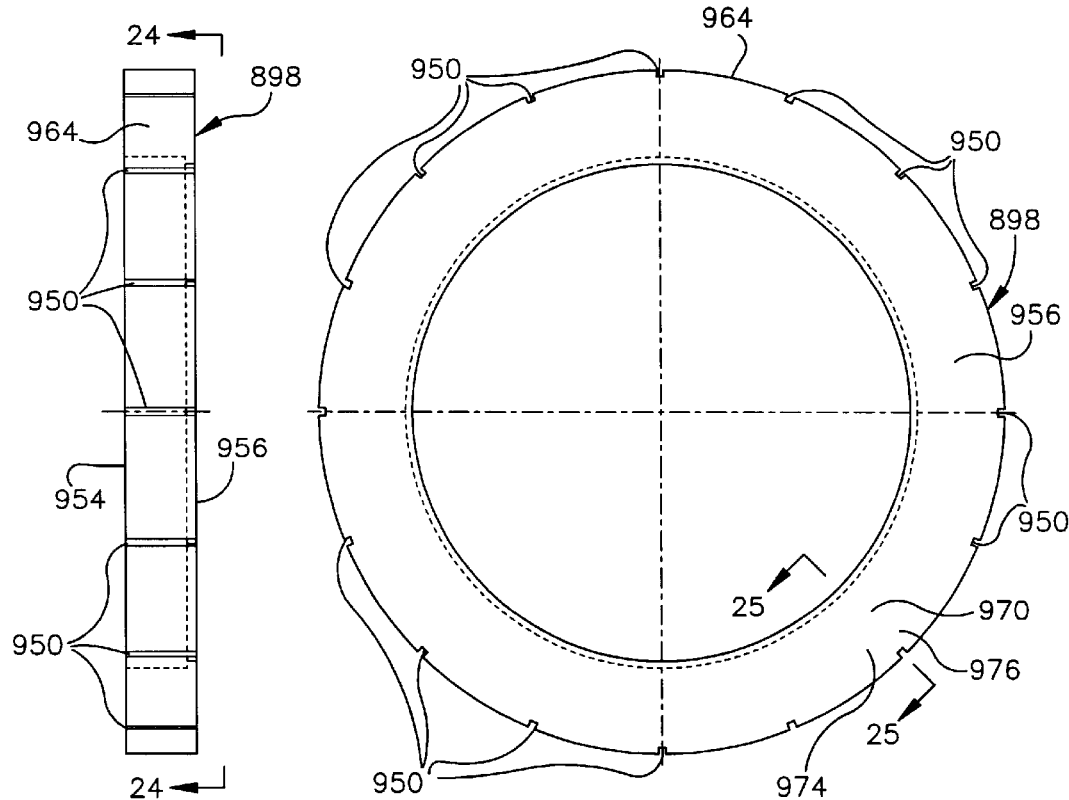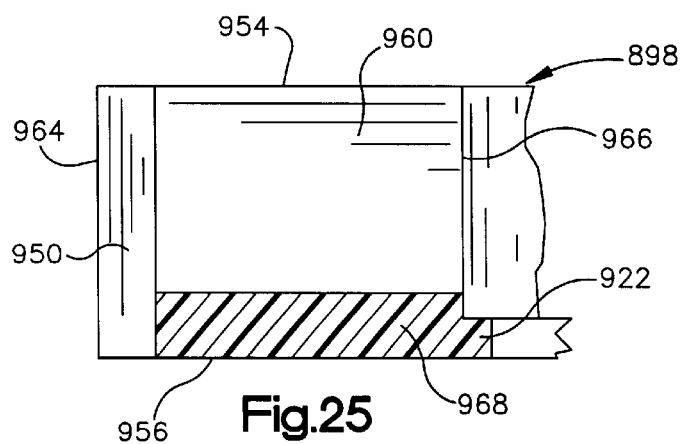

LOW CONTACT FORCE SPRING

CROSS REFERENCE TO RELATED APPLICATIONS

This application is a continuation in part of U.S. patent application Ser. No. 09/351,529, filed Jul. 12, 1999, now Pat. No. 6,322,059. The aforementioned application Ser. No. 09/351,529 is itself a continuation in part of U.S. patent application Ser. No. 09/121,544 filed Jul. 23, 1998, now abandoned. The benefit of the earlier filing dates of the aforementioned application Ser. Nos. 09/121,544 and 09/351,529 is hereby claimed. The disclosures in the aforementioned application Ser. Nos. 09/121,544 and 09/351,529 are hereby incorporated herein in their entirety by this reference thereto.

BACKGROUND OF THE INVENTION

1. Field of the Invention

The subject invention relates to a method and apparatus for use in a press assembly and, more particularly, to a cushion assembly which provides a yieldable force during operation of the press assembly from an open condition to a closed condition.

2. Description of the Invention Background

A variety of different products and components are manufactured utilizing apparatuses called "dies". A die can comprise a complex and expensive device that punches holes, cuts, bends, forms, etc. raw material (e.g., sheet metal and the like) that is placed within the die. For example, automobile fenders, side panels, etc. are typically formed from sheet steel that is placed within a die.

A die is typically operated by a mechanical pressing mechanism that can generate large amounts of force for pressing the die components together when the raw material is placed therein. A typical mechanical press can generate tons of pressing force depending upon its design. Most mechanical presses employ a large rotating flywheel arrangement and use a crankshaft or eccentric shaft to convert the rotary motion of the flywheel to a straight line pressing motion which is applied to a slide that contacts a portion of the die. The geometry of this combination of parts results in a changing mechanical advantage between the drive and the slide. For example, the mechanical advantage of the crank arm and connection assembly will vary from one, at a point near midstroke, to infinity at the bottom of the stroke.

The impact forces and associated shock loads created during the pressing process can result in undesirable wear and damage to various die and press components. Thus, to reduce die wear and damage, which can lead to costly down time and maintenance expenses, cushion assemblies have been employed to support the die on the machine and absorb a portion of the shock forces created thereby. U.S. Pat. No. 4,792,128 and U.S. Pat. No. 4,838,527 to Holley disclose various types of cushion assemblies.

A known cushion assembly, that is, a gas spring is also depicted in FIG. 1. As can be seen in FIG. 1, the cushion assembly 10 comprises a body 12 that slidably supports a piston 16 therein. The piston 16 is attached to a piston rod 18 that is oriented in the mechanical press to engage the bottom of the die or a movable table (known as a pin plate) that supports the die. The body 12 is hollow and is capped on one end by a cap 14. The cap 14 and the bottom of the piston 16 cooperate to define a gas chamber 20. The gas chamber 20 is charged with a compressible gas, such as nitrogen, through a conventional pressure valve 22 located in the cap 14. The piston rod 18 is slidably supported within the body 12 by a rigid rod support member 24 that is typically fabricated out of metal such as bronze. The upper end 13 of the body 12 is sealed with a retainer cap 26 that is affixed in position with a conventional retaining ring 28. As illustrated by arrow "A" in FIG. 1, the gas pressure within the chamber 20 serves to push the piston rod 18 out of the body 12 until the piston 16 contacts the rigid retainer 24. Such construction results in the preloading of the piston rod 18 such that the development of a contact force (i.e., the force required to initiate movement of the spring from the fully extended position) on the end of the piston rod 18 is required to compress the gas spring 10. Conventional cushion assembly designs deliver almost full force at contact and have relatively little force increase as the cushion assembly is compressed. This results in the application of high forces instantaneously at contact with the rod 18. This instantaneous force loading is transferred to the other components of the press and results in undesirable shock loading of the press and die.

FIG. 2 is a press tonnage curve of a typical mechanical press wherein known cushion assemblies of the type described above are employed. The vertical axis represents the amount of force (tonnage) generated by the press and the horizontal axis represents the distance that the press slide is away from its bottom limit of travel. As can be seen from that graph, the press load capacity increases along an arcuate slope to a certain point as the distance between the press slide and its bottom position increases. The tonnage signature is the actual application of forces by the press during operation and takes into account a variety of process variables such as speed, overloading, etc. The preload of the cushion assemblies can result in the undesirable shock overload depicted in FIG. 2 wherein the actual load exceeds the press load capacity. Such shock loading can result in die and press wear and failure, excessive noise, and undesirable pad bounce.

The preload characteristics of conventional cushion assemblies or gas springs of the type shown in FIG. 1 are a major contributor to the generation of shock loads and noise as well as excessive pad bound on the return stroke. In an effort to reduce the magnitude of initial contact forces applied to the piston rod, cushion assemblies that employ a floating piston (e.g., a piston that is not attached to the piston rod) and a dual gas chamber arrangement have been developed. The additional gas chamber purportedly serves to balance the net force on the piston rod at its fully extended position.

Swedish Patent No. 9401119-4 discloses a cushion assembly that employs a floating piston and a dual gas chamber arrangement. This reference also teaches that a damping body may also be employed to "further damp any residual noise." Such a cushion assembly requires additional sealing elements to be employed and produces undesirable dynamic effects due to inertia of the floating piston, and static friction of the seals.

FIG. 3 is a graphical comparison of the theoretical force curves of a conventional cushion assembly or gas spring of the type depicted in FIG. 1 and the above-mentioned spring that employs a floating piston. As can be seen from that Figure, the floating piston represents a modest improvement over the standard gas spring in that its initial curve (upon contact) is slightly sloped when compared to the essentially vertical curve of the conventional gas spring.

Another approach that has been employed to reduce gas spring contact force involved the use of cushion assemblies, that is, gas springs, that have stepped pistons. Such a spring is disclosed in U.S. Pat. No. 5,129,635 to Holley. FIG. 4 is a graphical comparison of the force curves of a conventional gas spring of the type depicted in FIG. 1 and a conventional gas spring that employs a stepped piston. As can be seen in that Figure, however, the undesirable instantaneous step function in the spring load is not eliminated when utilizing a spring with such a piston arrangement.

Thus, there is a need for a cushion assembly that has an improved shock loading characteristics during operation of a press assembly.

There is a further need for a press cushion assembly that can be constructed to provide a desired contact force while reducing undesirable shock during initial operation of the cushion assembly.

There is still another need for a spring arrangement with the above-mentioned characteristics that is relative easy to manufacture and service.

SUMMARY OF THE INVENTION

In accordance with a particularly preferred form of the present invention, there is provided a cushion assembly, that is, a spring assembly, that comprises a body that may have a bottom and a passage therein. A piston is slidably received within the passage and cooperates with the bottom of the body to define a fluid chamber therebetween. The fluid chamber is charged with a fluid material. A piston rod may be slidably supported within the passage by a support member that is affixed to the body. One end of the piston rod is attached to the piston and the other end thereof protrudes from the body for engagement with a force generating object, that is, with a member in a press assembly. A biasing member is provided between the support member and the piston. The biasing member may comprise an elastomeric material, Belleville washers, a coil spring or a second pressure chamber filled with additional fluid medium.

Another embodiment of the present invention comprises a spring assembly that includes a body that has a bottom and a passage therein. A first piston is slidably received within the passage and cooperates with the bottom of the body to define a fluid chamber therebetween. The fluid chamber is charged with a gaseous material. A piston rod is slidably supported within the passage by a support member that is affixed to the body. A piston is attached to one end of the piston rod while the other end of the piston rod protrudes from the body. A cavity is formed in the protruding end of the piston rod and is adapted to receive a second portion of the piston rod therein. An elastomeric material is provided between the bottom of the cavity and the second piston.

It is a feature of the present invention to provide a cushion assembly that can be used in connection with mechanical presses to reduce the shock loads created thereby.

It is another feature of the present invention to provide a press cushion assembly that is a low contact force fluid spring.

Yet another feature of the present invention is to provide a fluid spring that has an adjustable contact force while maintaining full tonnage resistance at the required work stroke of a mechanical press.

Accordingly, the present invention provides solutions to the shortcomings of the prior press cushion assembly arrangements. Those of ordinary skill in the art will readily appreciate, however, that these and other details, features and advantages will become further apparent as the following detailed description of the preferred embodiments proceeds.

BRIEF DESCRIPTION OF THE DRAWINGS

In the accompanying Figures, there are shown present preferred embodiments of the invention wherein like reference numerals are employed to designate like parts and wherein:

FIG. 19 is an enlarged fragmentary sectional view of a portion of FIG. 16, illustrating the relationship between a body of elastomeric material and other components of the cushion assembly when the cushion assembly is in the extended condition;

FIG. 20 is an enlarged fragmentary sectional view of a portion of FIG. 18, illustrating the relationship between the body of elastomeric material and other components of the cushion assembly when the cushion assembly is in the fully retracted condition;

FIG. 23 is a side elevational view of a force transmitting member or endwall used in the cushion assembly of FIGS. 21 and 22, prior to installation of the force transmitting member in the cushion assembly;

FIG. 24 is a plan view, taken generally along line 24—24 of FIG. 23, further illustrating the force transmitting member of FIG. 23;

FIG. 25 is a fragmentary sectional view, taken generally along line 25—25 of FIG. 24, further illustrating the construction of the cut to the force transmitting member of FIG. 23;

DETAILED DESCRIPTION OF THE PREFERRED EMBODIMENTS

Referring now too the drawings for the purposes of illustrating the present preferred embodiments of the invention only and not for the purposes of limiting the same, the Figures show a press cushion assembly or spring 50 of the present invention that may be employed with a mechanical press 30. The skilled artisan will readily appreciate, however, that while the present invention is particularly well-suited for use in connection with a conventional mechanical press, the springs disclosed herein could be successfully employed in a myriad of other presses. Accordingly, the protection afforded to the present preferred embodiments disclosed and claimed herein should not be limited to use in connection with any particular mechanical press.

Figure 5:
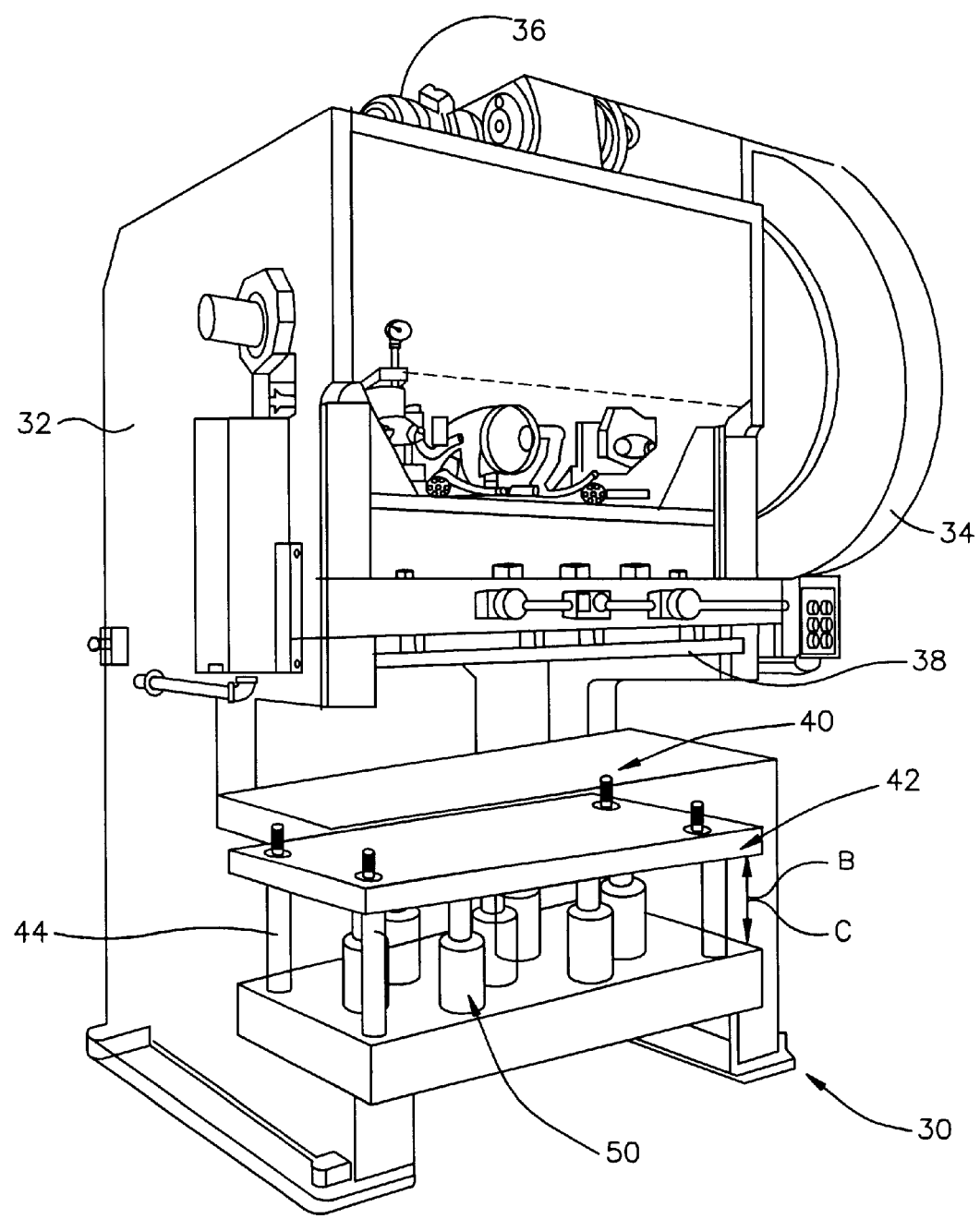
FIG. 5 is a perspective view of a conventional mechanical press wherein several cushion assemblies of the present invention may be employed.

A conventional mechanical press is depicted in FIG. 5. As can be seen in that Figure, press 30 has a frame 32 and a flywheel 34 operably attached thereto. A crankshaft 36 is attached to the flywheel and a slide plate or upper member 38 is attached to the bottom of the crankshaft. A die or lower member 40 may be supported on a pin plate 42 that is slidably supported on a plurality of springs 50 and a series of guide posts 44. Those of ordinary skill in the art will appreciate that upon operation of the press 30, the slide plate 38 travels up and down in the directions represented by arrows (B, C).

Figure 6:
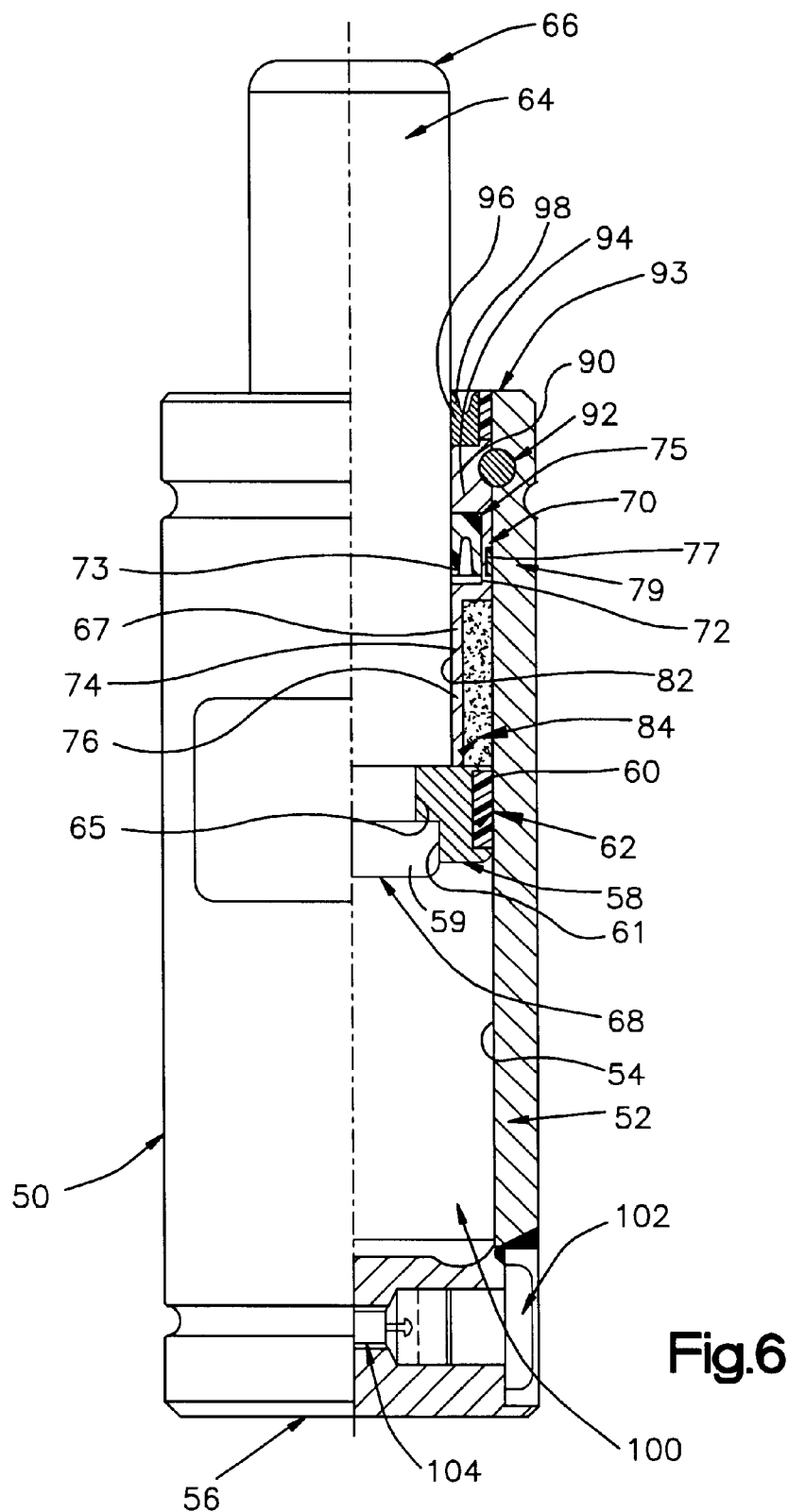
FIG. 6 is a partial cross-sectional view of one press cushion assembly constructed in accordance with the present invention.

FIG. 6 depicts one press cushion assembly constructed in accordance with the present invention. As can be seen in that Figure, the press cushion assembly or spring 50 includes a body member 52 that is preferably fabricated from steel such that it defines a piston receiving passage 54 therein. An end cap 56 is preferably attached to the bottom of the body member 52, preferably by welding or other suitable means, to create a fluid-tight seal between the end cap 56 and the body 52. A piston assembly 58, preferably fabricated from hardened steel, is sized to be slidably received within the passageway 54. To facilitate slidable travel of the piston assembly 58 within the passageway 54, an annular piston bearing 62, preferably fabricated from bronze, is pressed into an annular cavity 60 within the piston assembly 58.

Figure 7:
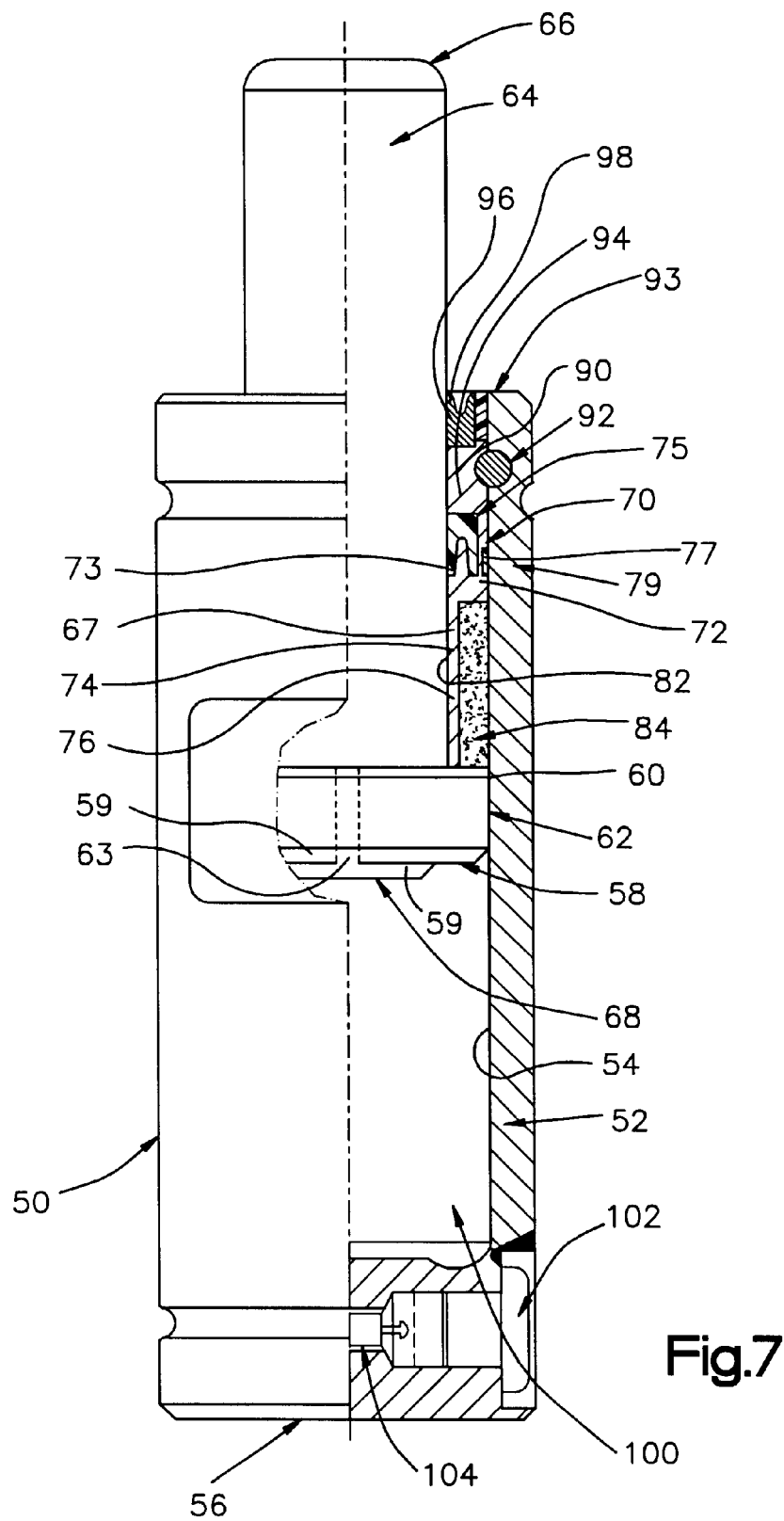
FIG. 7 is another partial cross-sectional view of the spring of FIG. 6 with a piston thereof shown in full view.

Piston assembly 58 includes a head end portion and a rod end portion. The rod end portion includes a piston rod 64 that is preferably fabricated from hardened steel covered with chrome plating. Piston rod 64 has a first end 66 that protrudes from the passageway 54 and is adapted to engage a portion of a machine such as a pin plate 42 of a mechanical press 30. The other end 68 of the piston rod 64 is adapted to be affixed to and forms part of the head end portion of the piston assembly 58. To facilitate easy assembly and replacement of the piston assembly 58, a shoulder 65 is preferably machined into the end 68 of the piston rod 64 at the head end portion of the piston assembly, as shown in FIG. 6. Piston assembly 58, in a preferred form, consists of two piston halves 59 that each have a complementary step 61 machined therein that is constructed to interface with the shoulder 65 in the piston rod 64 as shown. To facilitate slidable travel of the piston assembly 58 within the passageway 54, an annular piston bearing 62, preferably fabricated from a polymeric material, is assembled into an annular cavity 60 within the piston assembly 58. Referring to FIG. 7, when assembled, a passageway 63 is provided between the halves 59 to permit pressurized fluid to pass therebetween. Thus, to affix the piston assembly 58 to the piston rod end 68, the halves 59 of piston 58 are arranged on the shoulder portion 65 of the piston rod 64 and the piston bearing 62 is installed around the two piston halves 59. The piston assembly is then slid into the passageway 54. The skilled artisan will readily appreciate, however, that other methods of affixing the piston assembly 58 to the piston rod 64 may also be employed.

Piston rod 64 is slidably supported within the passageway 54 by a piston rod support member 70 and a retaining cap 90. More particularly, and with reference to FIG. 6, the piston rod support member 70 is preferably fabricated from a rigid material such as steel and has a flanged upper portion 72 and a cylindrical body portion 74. A through passage 76 extends through the flanged portion 72 and the body portion 74 to slidably receive the piston rod 64 therethrough. A cavity 73 is preferably provided in the flanged portion 72 for receiving a commercially available "U-cup" 75 therein. To establish a fluid-tight seal between the piston rod support member 70 and the body 52, an O-ring 79 is preferably seated in an annular passage 77 machined in the perimeter of the flanged portion 72 of the piston rod support member 70.

As can be seen in FIG. 6, a cavity is preferably formed between the body 52 and the body portion 74 of the piston rod support member 70 for receiving a biasing unit which is an annular body 84 of elastomeric material. In a preferred embodiment, bumper member 84 comprises an elastomeric material such as urethane. However, other materials such as nitrile or fluorinated hydrocarbon could also be successfully employed. The purpose of the bumper member 84 will be discussed in further detail below.

The spring assembly 50 preferably further includes a retainer cap 90 that is removably affixed to the body 52 by a commercially available retainer ring 92. In a preferred embodiment, a rubber dust seal member 93 is inserted in the groove between the body 52 and the retainer cap 90 as shown in FIG. 6. Retainer cap 90 has a passage 94 therethrough that is adapted to slidably receive the piston rod 64. In a preferred embodiment, an annular cavity 96 is coaxially aligned with passage 94 to receive a commercially available scraper ring 98 therein. Scraper ring 98 is preferably fabricated from polyurethane. The lower surface of the piston assembly 58 cooperates with the end cap 56 attached to the body 52 to define a fluid chamber 100 within the passageway 54. See FIG. 6. The fluid chamber 100 is preferably charged with a gaseous medium through a commercially available charging valve 102 installed in the end cap and communicating with a passageway 104 that adjoins the fluid chamber 100. The construction and operation of the charging valve 102 is well known in the art and, as such, will not be discussed in detail herein.

The fluid chamber 100 is charged with a pressurized fluid. As used herein, the term "fluid" can comprise a liquid medium or a gaseous medium. In a preferred embodiment, a fluid medium such as nitrogen gas at a preferred pressure of 2175 psi is employed. However, other mediums such as oil at pressures dictated by the particular application can also be successfully used.

In a "rod seal" device, such as this, the piston halves 59 do not compress the fluid, due to the passageway 63 which allows the fluid to flow across the piston 58. The piston halves 59 act only to guide and retain the piston rod 64. In a rod seal device, the fluid is compressed by the rod moving into the fluid chamber and taking up some of the volume used by the fluid. The force in a rod seal device is generated by the fluid pressure within the chamber 100 pushing on the rod end 68.

Figure 1:
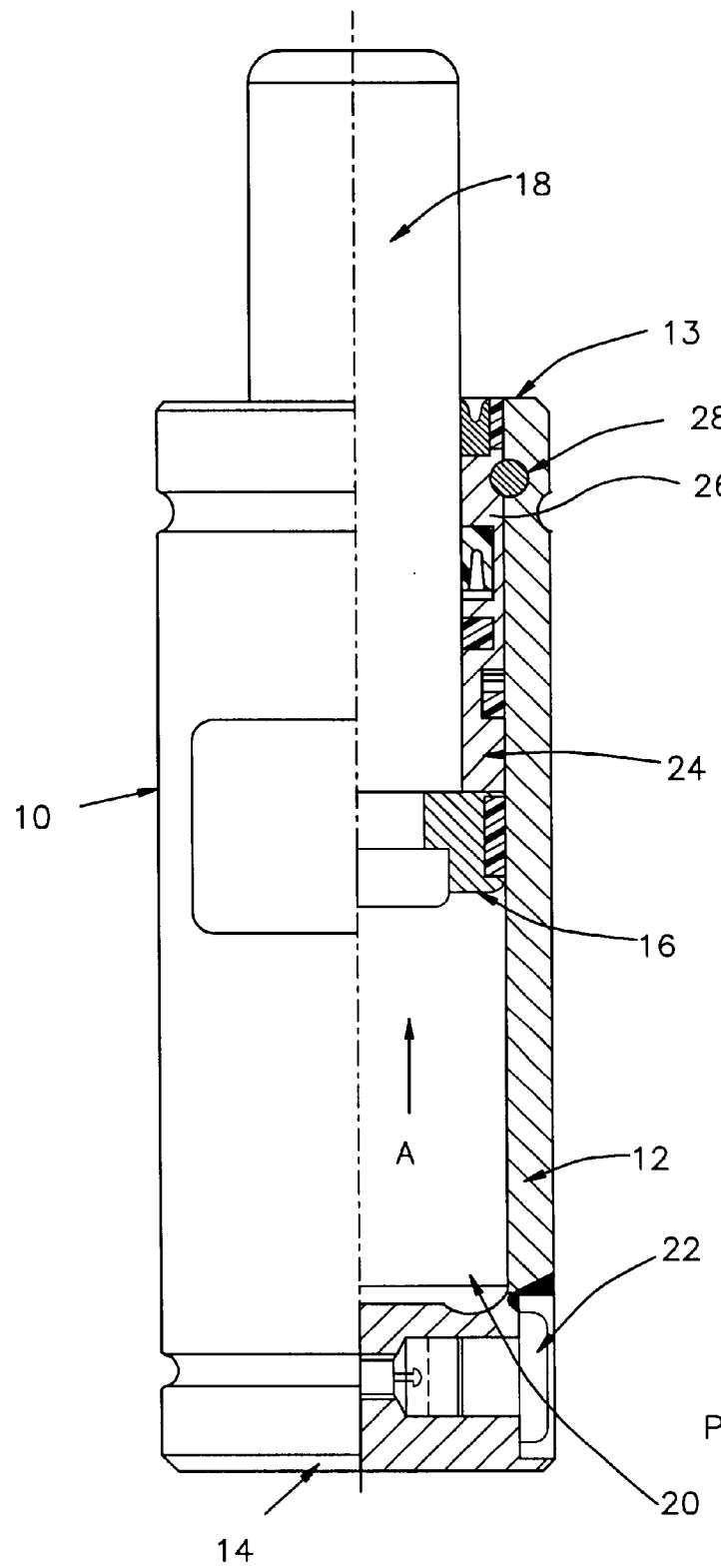
FIG. 1 is a partial cross-sectional view of a known cushion assembly, that is, a gas spring.
Figure 2:
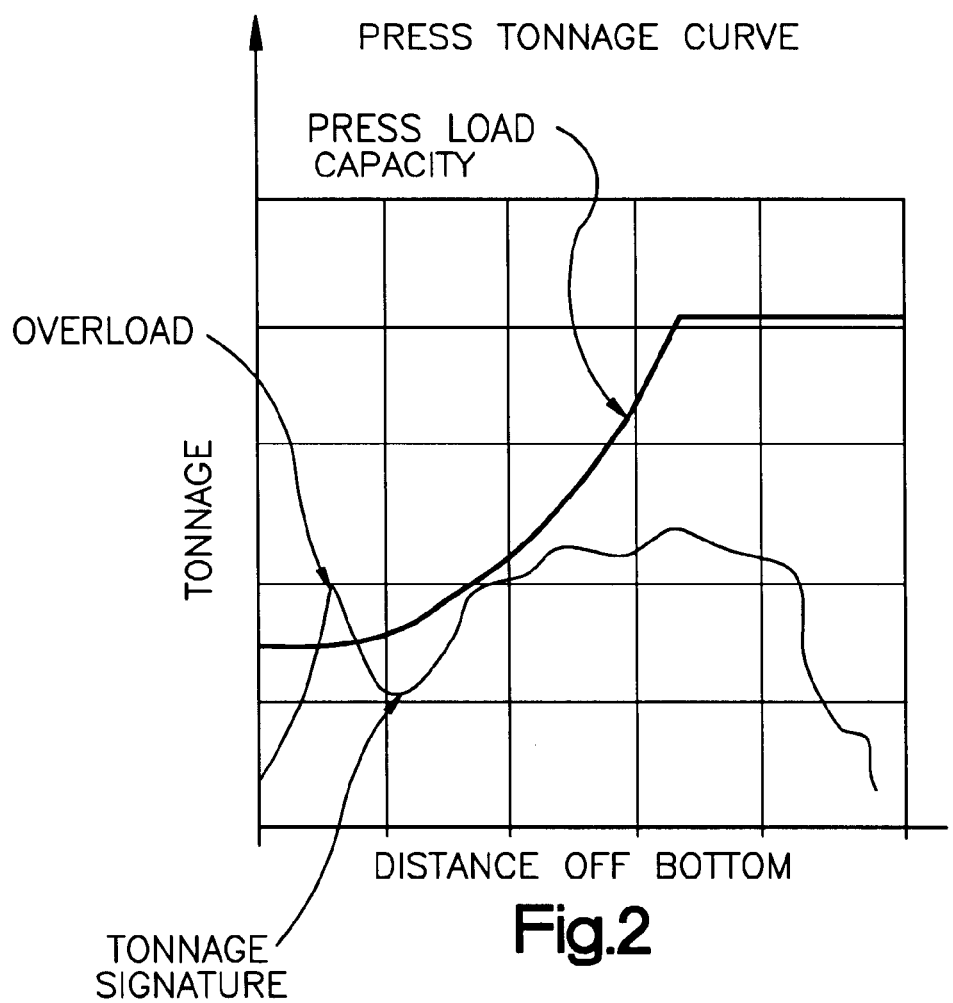
FIG. 2 is a graph of a tonnage curve of a conventional mechanical press.
Figure 3:
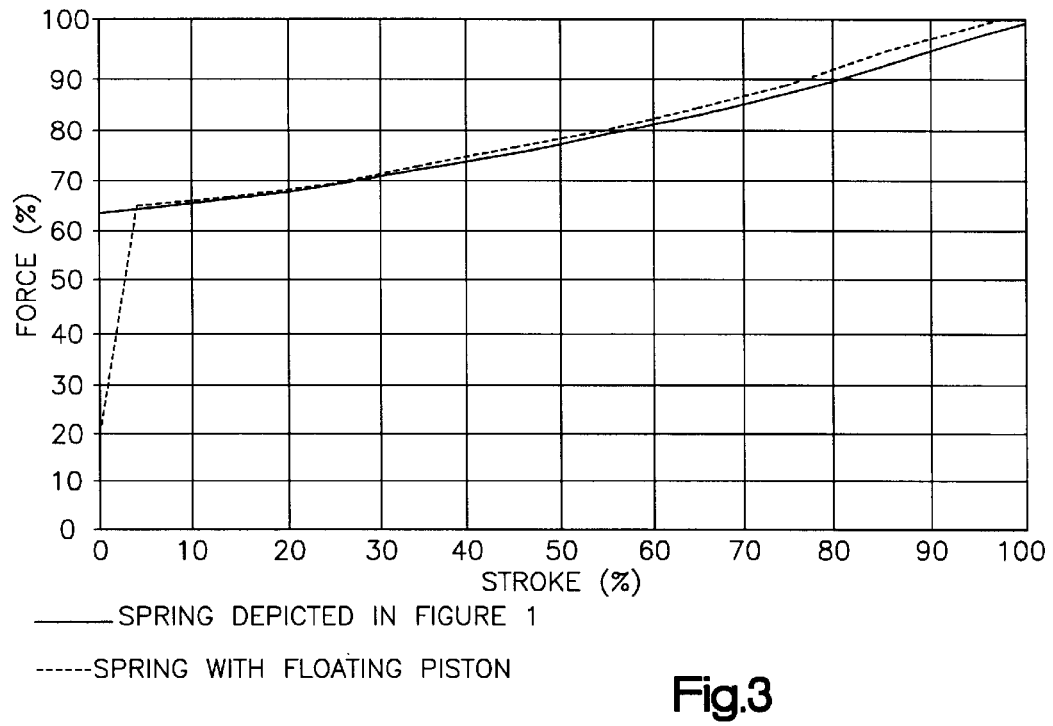
FIG. 3 is a graphical comparison of the force v. Stroke curves of a known cushion assembly depicted in FIG. 1 and a cushion assembly that employs a floating piston.
Figure 4:
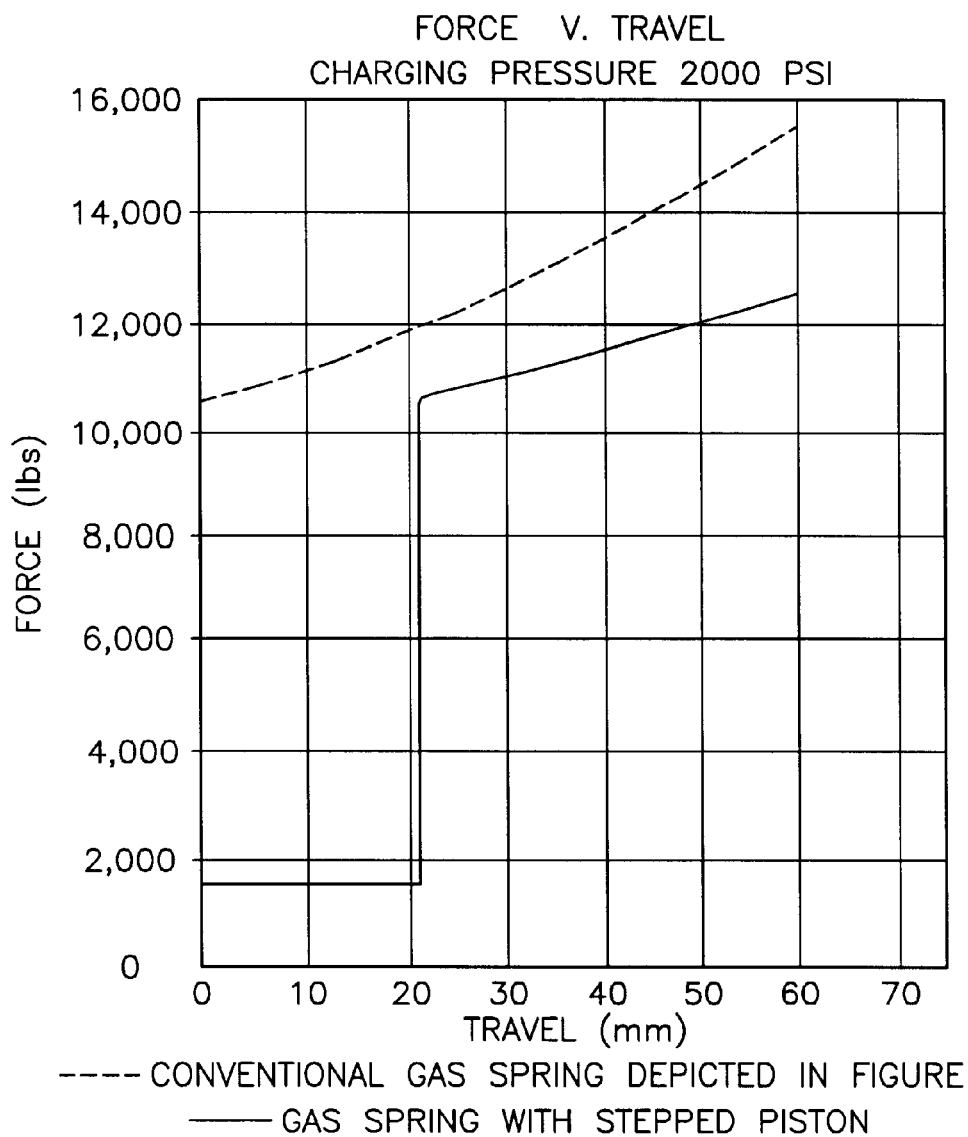
FIG. 4 is a force v. travel curve of a conventional cushion assembly that employs a stepped piston.
Figure 8:
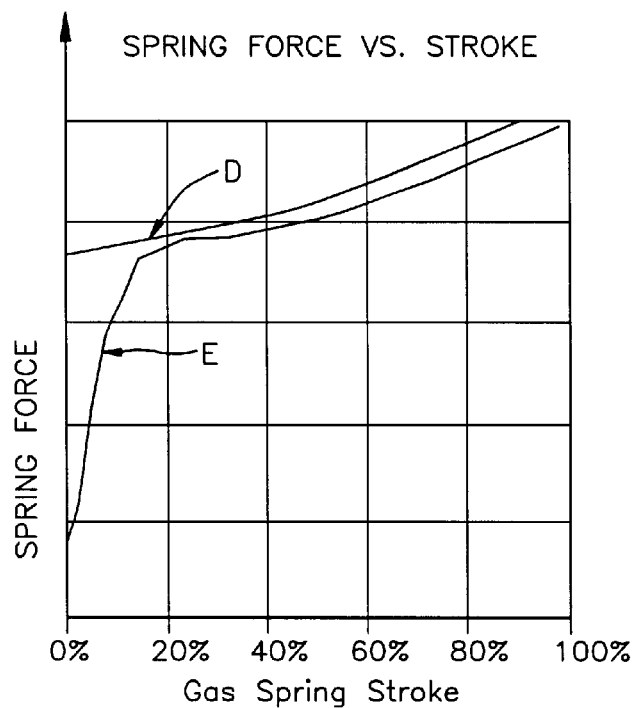
FIG. 8 is a graphical comparison of the force v. stroke curves of a known cushion assembly depicted in FIG. 1 and a press cushion assembly constructed according to the present invention.
Figure 9:
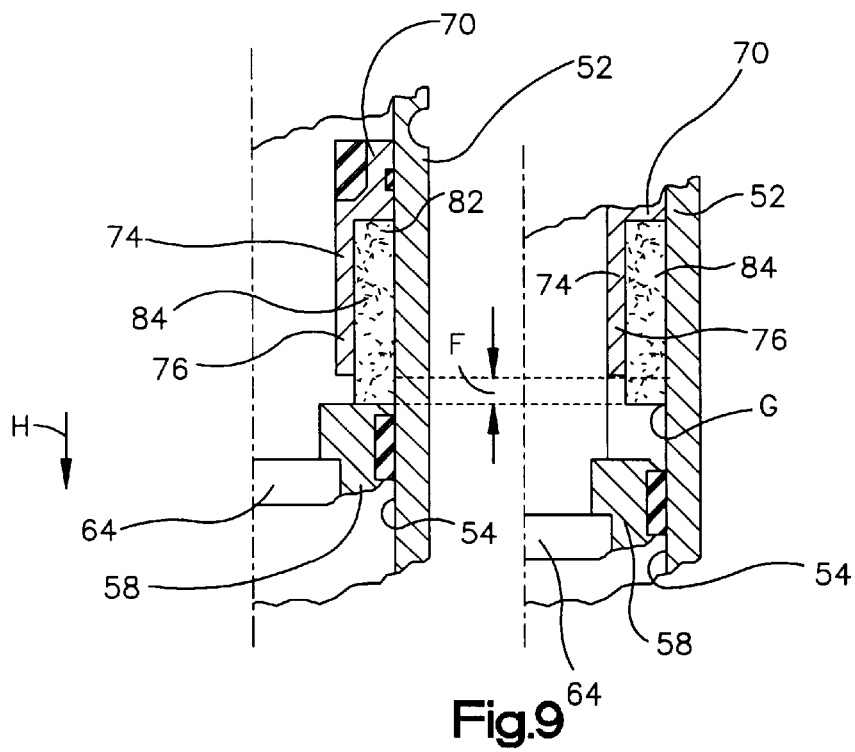
FIG. 9 is a partial cross-sectional view of portions of the press cushion assembly of FIG. 7 with the piston thereof in different compressed positions.

FIG. 8 is a graphical comparison of the force curves of a conventional spring member of the type depicted in FIG. 1 and the spring of the present invention shown in FIG. 7. Line "D" in that Figure represents the force curve for a conventional spring 10 of the type depicted in FIG. 1. Line "E" represents the force curve for a spring 50 of the present invention as shown in FIG. 7. As can be seen from FIG. 8, the force curve for spring 50 has a lower contact force (i.e., the force needed to initiate spring movement at 0%) than the force curve of spring 10. The bumper member 84 of the present invention serves to balance the force exerted on the piston rod 64 by the gas pressure within the chamber 100. The net force exerted by the piston rod 64 is reduced by the balancing force from the bumper member 84 as shown in FIG. 9. The characteristics of the resulting force curve of the spring 50 of the present invention (line E in FIG. 8) are controlled by the relative stiffness of the bumper member 84 as well as the compression distance "F" as shown in FIG. 9.

The resultant force curve "E" in FIG. 8 is the force curve for a conventional spring, such as shown by curve "D", minus the force required to compress the bumper. In FIG. 8, for a stroke greater than 20%, the bumper is preferably completely uncompressed and the curve "E" follows curve "D" (the two curves are shown slightly separated in FIG. 8 for clarity).

Initial compression of the piston rod 64 results in a diminishing balance force produced by the bumper member 84. Such balancing force is reduced to zero upon reaching position "G". As the piston rod 64 is further compressed in the "H" direction a distance greater than "F", the mode of operation of the spring 50 is dependent upon the fluid pressure within the chamber 100. Those of ordinary skill in the art will appreciate that the rigid retainer member 70 provides for a positive repeatable extended height of the piston rod 64 as well as acting as a compression limiter for the bumper member 84.

Figure 10:
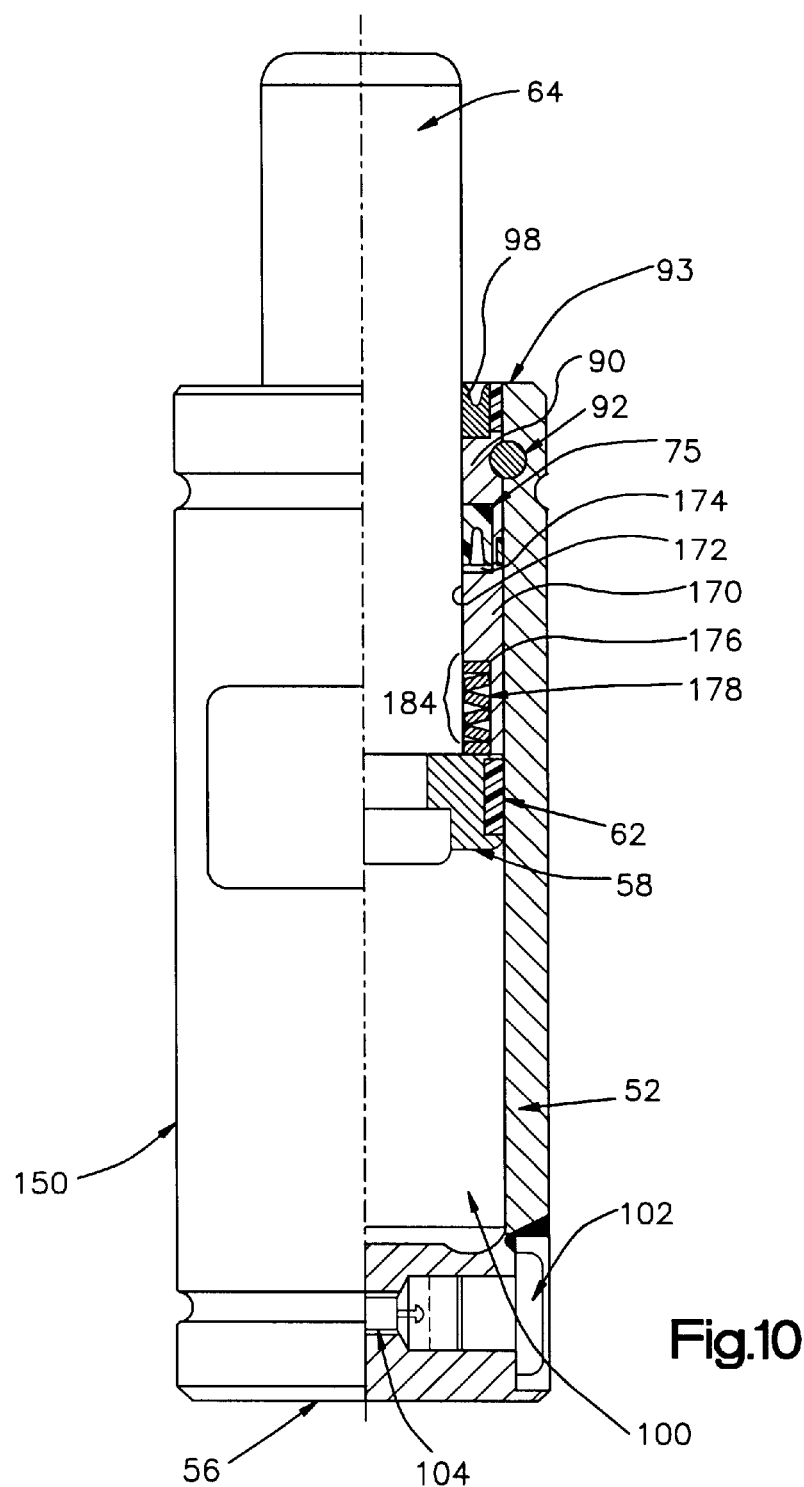
FIG. 10 is a partial cross-sectional view of another press cushion assembly constructed in accordance with the present invention.

FIG. 10 depicts another spring embodiment of the present invention. Preferably, the spring 150 has a construction that is identical to the construction of spring 50, except for the differences discussed below. In this embodiment, the retainer member 170 is cylindrical in shape and is fabricated from a rigid material such as steel. Retainer member 170 has a hole 172 extending therethrough for receiving the piston rod 64. A cavity 174 is provided in the upper end of the retainer member 170 for receiving a commercially available U-cup member 75 therein. A second cavity 176 is provided in the bottom portion of the retainer member 170 and is adapted to receive a collection of disc springs 178 (commonly known as Belleville washers) which collectively act as a bumper member 184. The skilled artisan will appreciate that the contact force characteristics achieved by such spring 150 construction can be altered by altering the number and strength of the Belleville springs 178.

Figure 11:
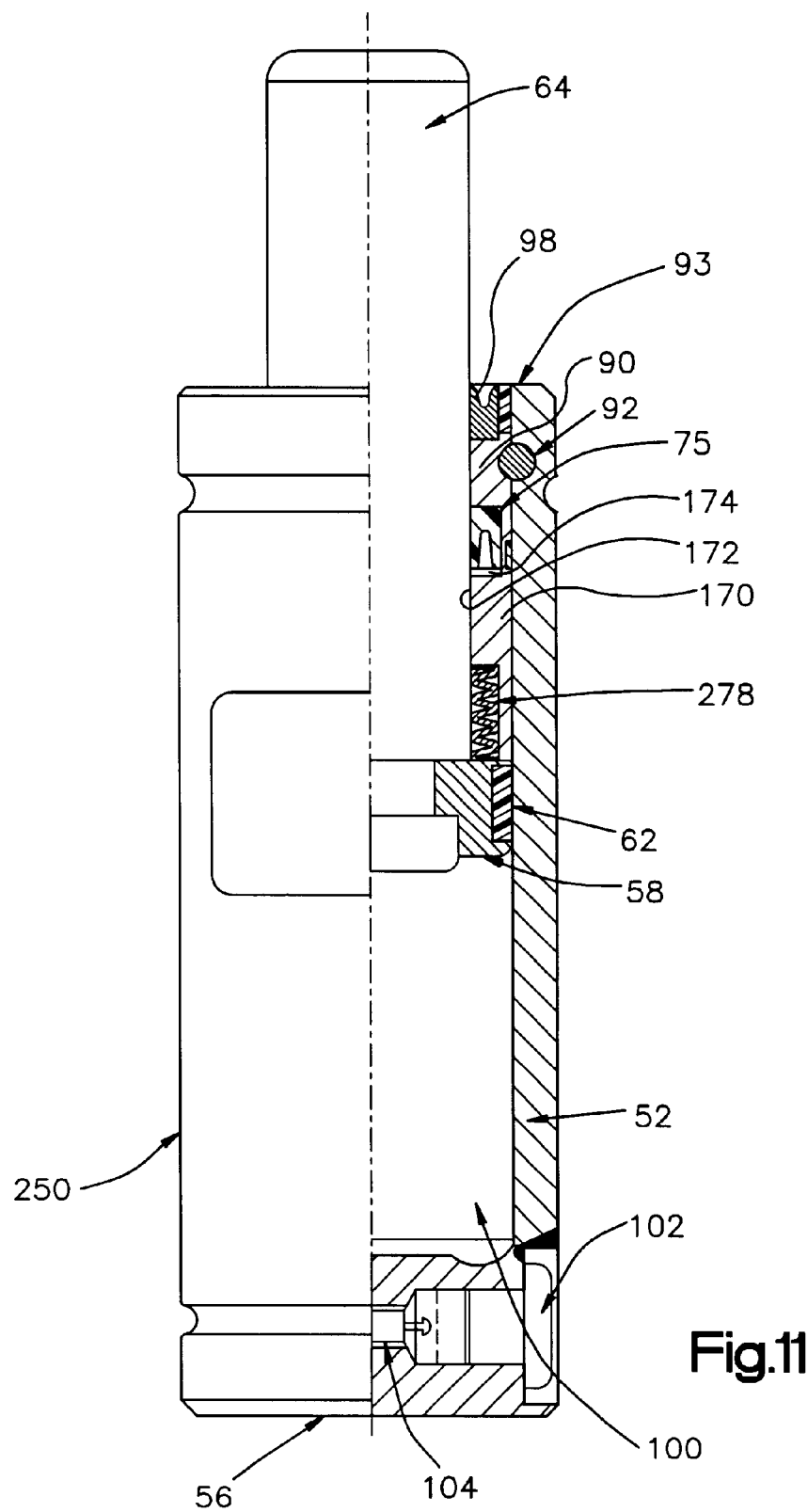
FIG. 11 is a partial cross-sectional view of another press cushion assembly constructed in accordance with the present invention.

FIG. 11 depicts another embodiment of the present invention. The spring 250 depicted in FIG. 11 is identical in construction as to the spring 150, except that the Belleville washers have been replaced with a commercially available coil spring 278. Again the skilled artisan will appreciate that the contact force characteristics of the spring 250 can be adjusted by altering the coil spring strength.

Figure 12:
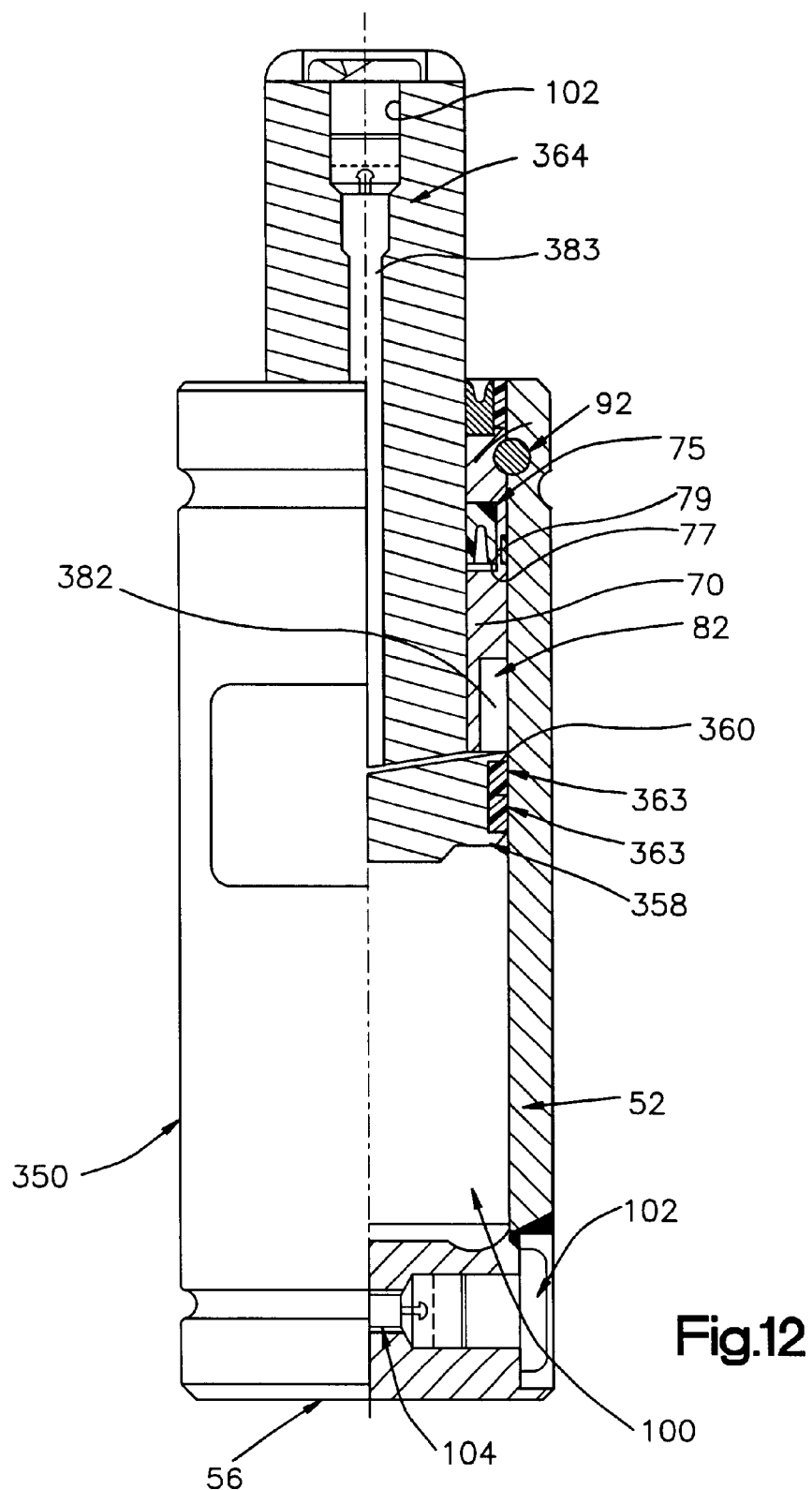
FIG. 12 is a partial cross-sectional view of another press cushion assembly constructed in accordance with the present invention.

Another embodiment of the present invention is depicted in FIG. 12. The spring 350 illustrated therein is substantially identical to spring 50 except for the differences discussed below. In this embodiment, piston rod 364 is integrally formed with the piston 358 from hardened steel. A cavity 360 is formed in the outer perimeter of the piston portion 358 for receiving a pair of commercially available U-cups 363 that serve to form a substantially fluid-tight sliding seal between the piston portion 358 and the body member 52. The cavity 82 in the rigid retainer member 70 forms a second fluid chamber 382 that is charged with a second amount of pressurized fluid, preferably nitrogen gas, through a secondary fill port 383 that is provided in the piston rod 364. A charge valve 102 is also provided in the end of the piston rod 364 to facilitate charging of chamber 382 and retention of the pressurized fluid therein. Thus, the gas in the second fluid chamber 382 serves as a bumper member for the piston 358. Those of ordinary skill in the art will appreciate that such novel arrangement of a piston that is rigidly affixed to the piston rod (e.g., non-floating), represents an improvement over springs that employ a floating piston rod and dual gas chambers because of the removal of the sliding seals on the outer and inner diameters of the floating piston, which could potentially leak, as well as the removal of the dynamic interaction between the friction of the floating piston seals and the ability of the floating piston to move freely and equalize pressure.

Figure 13:
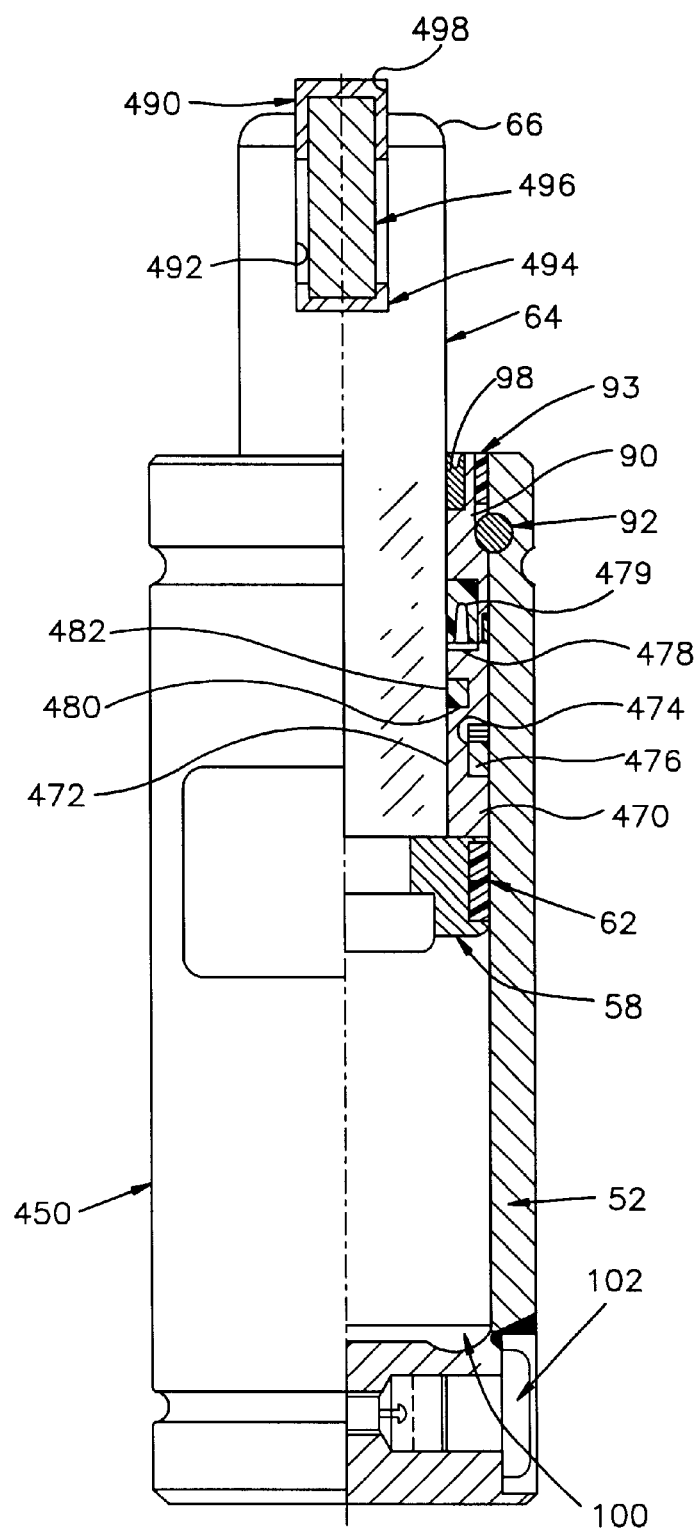
FIG. 13 is a partial cross-sectional view of another press cushion assembly constructed in accordance with the present invention.

FIG. 13 depicts another embodiment of the present invention. The spring 450 depicted in FIG. 13 is substantially similar to spring 50 except for the following differences. The piston rod retainer 470 is fabricated from rigid material such as steel and has a hole 472 therethrough for slidably receiving the piston rod 64. An annular cavity 474 is preferably provided in the outer circumference of the retainer 470 for receiving an O-ring 476 therein. O-ring 476 serves to establish a fluid-tight seal between the retainer member 470 and the body 52. Retainer 470 additionally has a cavity 478 therein that is adapted to receive a commercially available U-cup 479 therein. In addition, a second cavity 480 is provided in the retainer 470 for receiving a second O-ring 482 therein to establish a fluid-tight seal between the piston rod 64 and the retainer 470. Also in this embodiment a second piston 490 is affixed to the end 66 of the piston rod 64. More particularly and with reference to FIG. 13, a cavity 492 is provided in the end 66 of the piston rod 64. Preferably, a first piston support member 494 is received within the bottom of the cavity 492. Also in a preferred embodiment, an elastomeric material 496 such as urethane is received within the cavity 492 as shown. A second piston support member 498 is positioned over the elastomeric member 496 as shown in FIG. 13. Those of ordinary skill in the art will appreciate that the second piston arrangement of this embodiment of the present invention represents an improvement over prior springs that employ a stepped piston because of the reduction in the number of sliding seals, which could potentially leak. Also, the compression of an elastomer within a constrained volume generates a nonlinear force response that could be matched to the force of the spring, thereby removing the step response of the spring. Matching the compression of the elastomer with the force of the spring could remove sudden changes in force as the spring is compressed, thus reducing shock to the press and the die.

Figure 14:
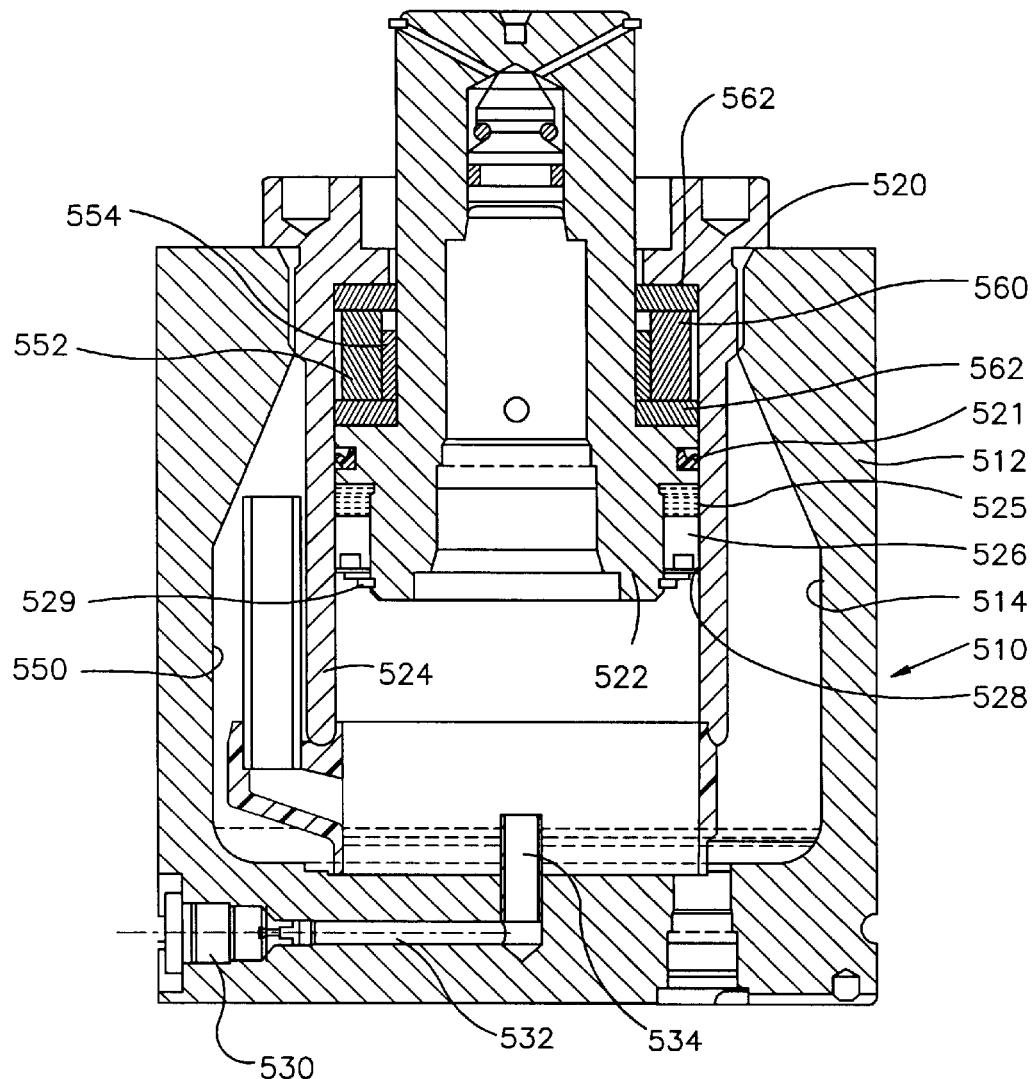
FIG. 14 is a partial cross-sectional view of another press cushion assembly constructed in accordance with the present invention.

The subject invention is also particularly well-suited for use in connection with spring assemblies that employ a self-lubricating piston arrangement. FIG. 14 depicts a spring assembly 510 that is constructed with a self-lubricating piston cylinder unit 520. The construction and operation of such a self lubricating piston is disclosed in U.S. Pat. No. 4,692,902 to Kadis, the disclosure of which is hereby incorporated by reference. Spring 510 includes a body 512 that defines a piston-receiving cavity 514 therein that is sized to receive a piston cylinder unit 520. Piston cylinder unit 520 is attached to the body 512 preferably by means of a threaded connection. The piston cylinder unit 520 includes a piston 522 that is adapted to slide within the piston cylinder wall member 524. Piston 522 is fitted with a U-cup seal member 528 to establish a fluid-tight seal between the cylinder wall 524 and the piston 522.

Figure 15:
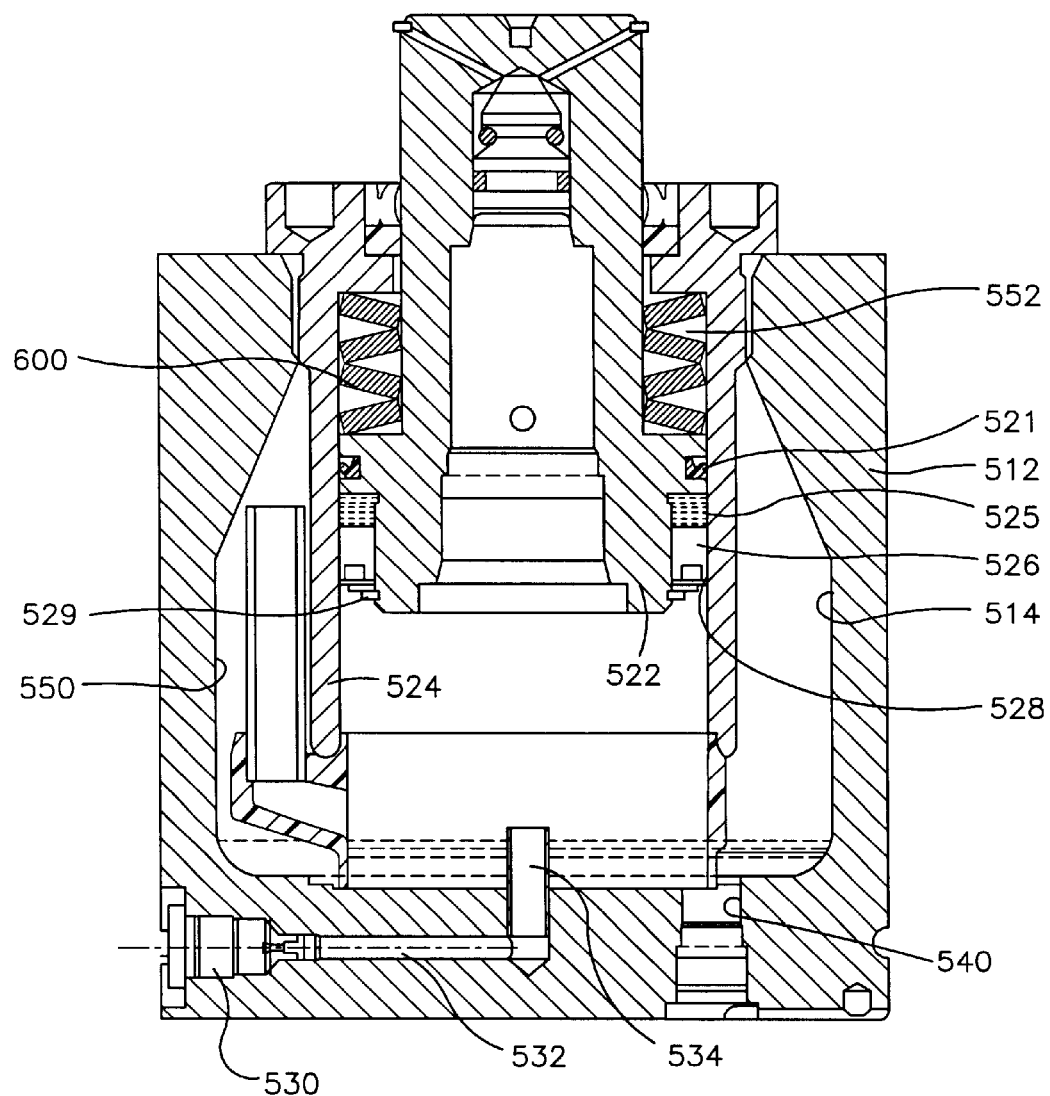
FIG. 15 is a partial cross-sectional view of another press cushion assembly constructed in accordance with the present invention.

A commercially available charge valve 530 is provided in the bottom of the body 512. The charge valve 530 communicates with a passage 532 that communicates with an upwardly extending standpipe 534. Such arrangement permits a compressible gas such as nitrogen to be admitted into the piston-receiving cavity 514. A lubricating medium 542 such as oil can be pumped into the piston-receiving cavity 514 through a lubrication passage 540 in the bottom of the body member 512. Body member 512 is also preferably formed with an oil expansion reservoir 550. When the piston 522 is compressed towards the bottom of the body 512, the gas and lubricating medium 542 is forced into the oil expansion reservoir 550. As the piston 522 extends towards the top of the body, the gas and lubricating medium 542 flow into the center of the spring, spraying lubricant on the piston 522 and cylinder 524. In this embodiment, a cavity 552 is formed between the piston 522 and the cylinder wall 524 as shown in FIG. 14. Preferably a steel sleeve 554 is provided around the piston 522 and an elastomeric bumper member 560 is provided between a pair of washers 562 as shown. The bumper member 560 is preferably comprised of urethane elastomer. However, other materials such as nitrile or fluorinated hydrocarbon could be successfully employed. FIG. 15 depicts another embodiment, wherein the elastomeric material of the embodiment of FIG. 14 has been replaced with a plurality of Belleville washers 600.

Figure 16:
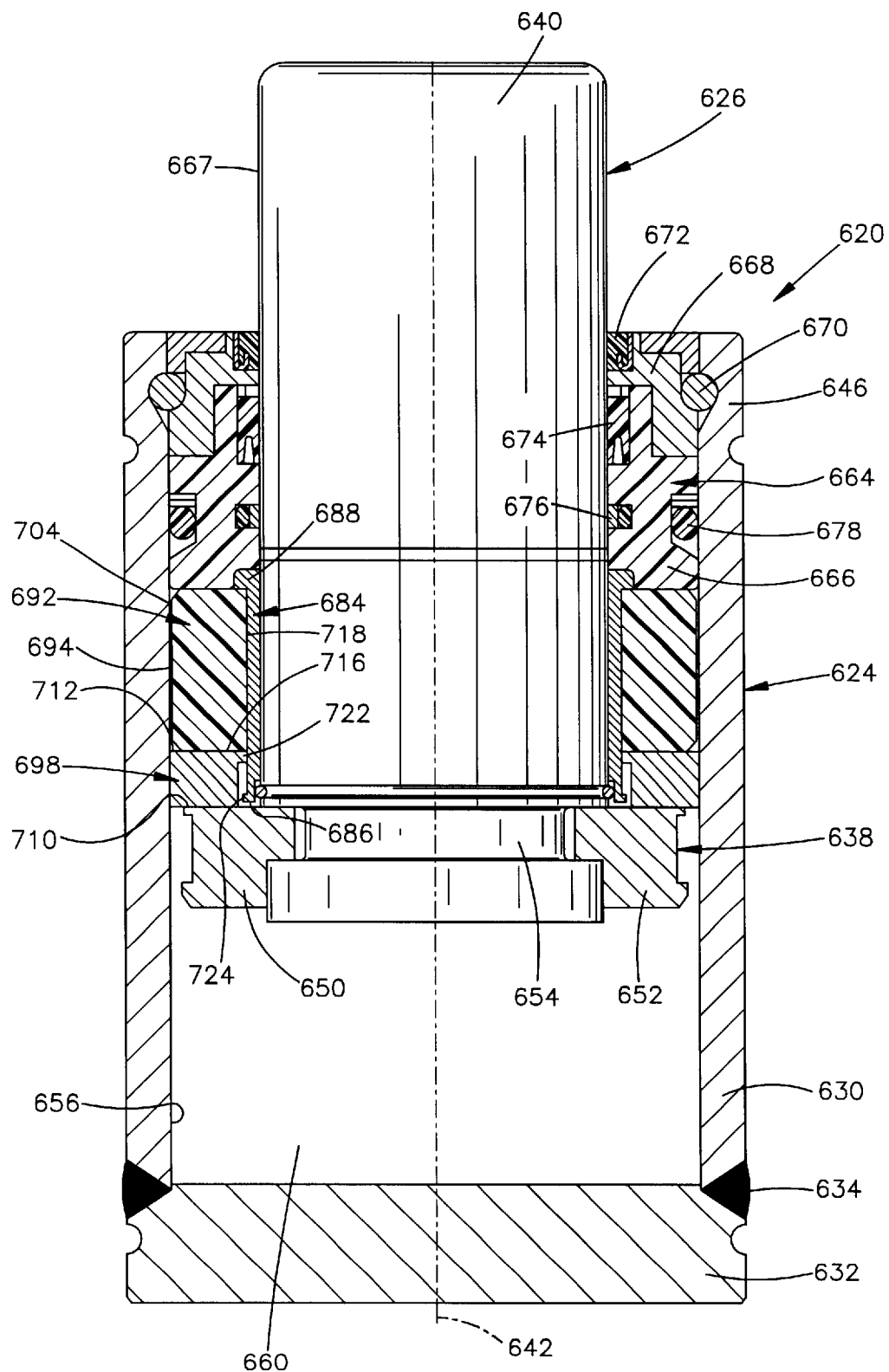
FIG. 16 is a sectional view of another cushion assembly constructed in accordance with the present invention, the cushion assembly being illustrated in an extended condition.

A press cushion assembly 620 constructed in accordance with another embodiment of the present invention is illustrated in FIG. 16. The press cushion assembly 620 is used in a press assembly, which may have a construction similar to the construction of the press assembly 30 illustrated in FIG. 5. However, rather than being associated with a lower member of the press assembly, as is illustrated schematically in FIG. 5, the cushion assembly 620 could be associated with an upper member in the press assembly, such as the slide plate 38. It should be understood that the press cushion assembly 620 could also be associated with movable draw rings in a press, in a manner similar to that disclosed in U.S. Pat. No. 5,003,807.

Any one of the embodiments of the cushion assemblies disclosed herein could be used in many different types of press assemblies which are operable from an open condition to a closed condition to deform a workpiece. The cushion assemblies disclosed herein may be used in association with many different components of a press assembly. For example, the cushion assemblies disclosed herein could be used in association with double action forming dies, ram levelers, bump dies, cam pads and returns, and/or multiple die sets.

Figure 17:
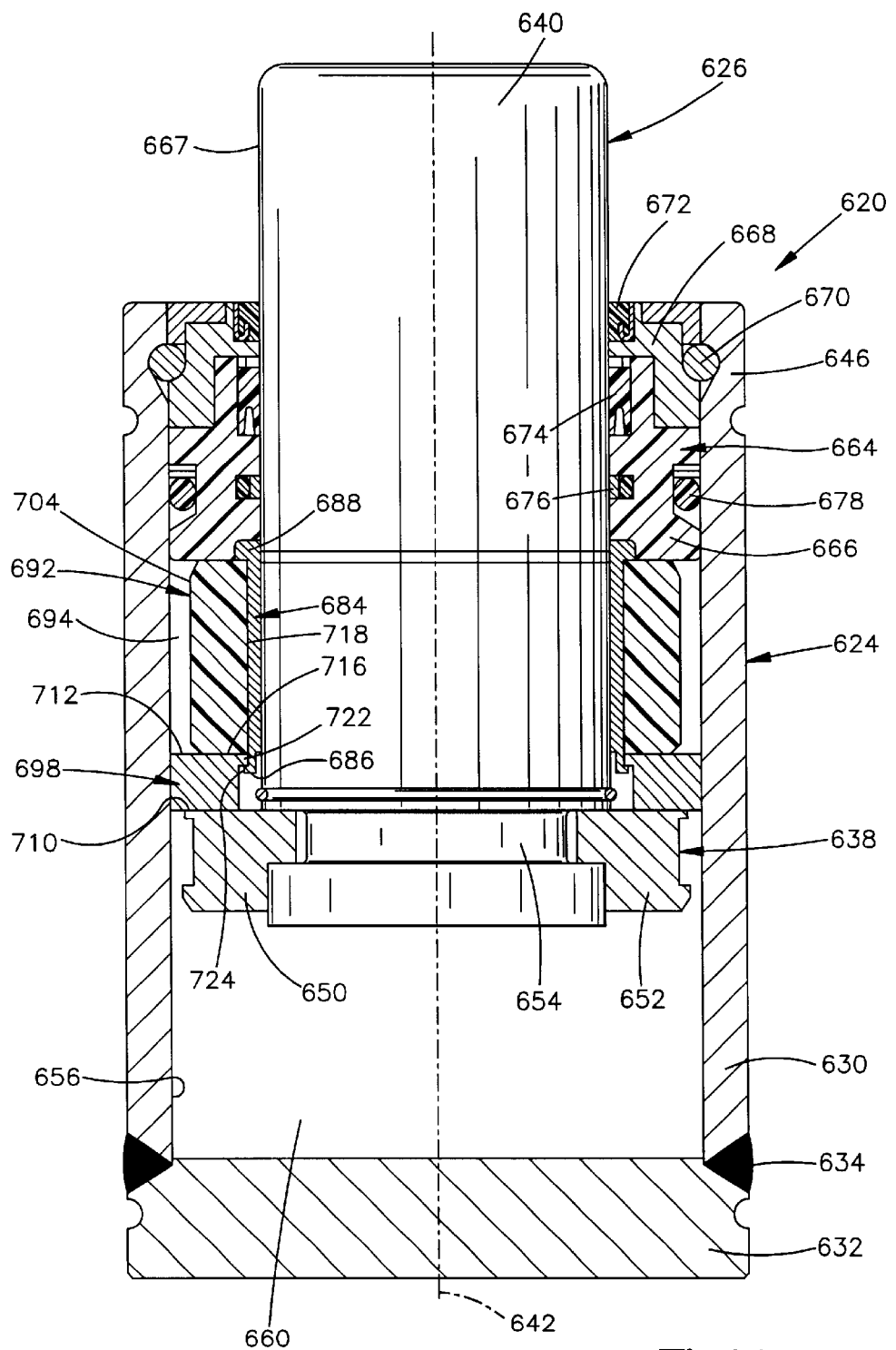
FIG. 17 is a sectional view of the cushion assembly of FIG. 16, the cushion assembly being shown in a partially retracted condition which occurs at the end of an initial period of retraction of the cushion assembly.
Figure 18:
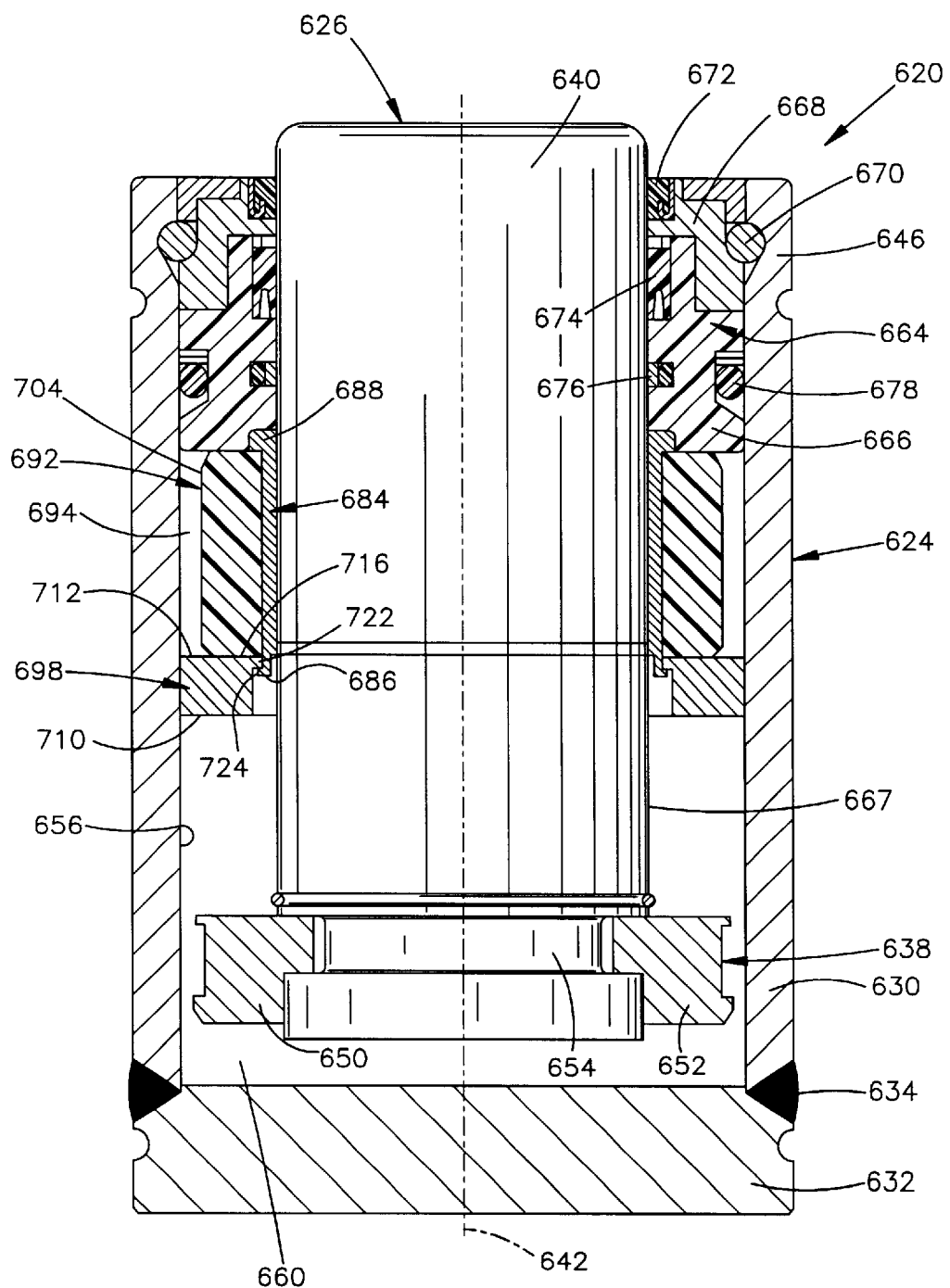
FIG. 18 is sectional view, generally similar to FIGS. 16 and 17, illustrating the cushion assembly in a fully retracted condition.

The press cushion assembly 620 is operable from an extended condition illustrated in FIG. 16 through a partially retracted condition, illustrated in FIG. 17, to a fully retracted condition, illustrated in FIG. 18. During operation of the press cushion assembly 620 from the extended condition to the retracted condition, the press cushion assembly provides a yieldable force opposing movement of one member in a press assembly, for example the slide plate 38 of FIG. 5, relative to another member in the press assembly, for example, the die 40. Of course, the press cushion assembly 620 could be used with other components of a press assembly.

The cushion assembly 620 includes a cylinder 624 (FIG. 16) and a piston 626. The cylinder 624 includes a cylindrical side wall 630 and a circular end wall 632. The side wall 630 and end wall 632 are interconnected at an annular weld 634. Rather than utilizing a separate cylinder 624, a plurality of cushion assemblies 620 could be associated with a manifold plate, in a manner similar to the disclosures in U.S. Pat. Nos. 4,583,722; 4,765,227; and 4,257,254.

The piston 626 includes a head end portion 638 and a rod end portion 640. The rod end portion 640 has a cylindrical configuration and is coaxial with a central axis 642 of the press cushion assembly 20. The rod end portion 640 of the piston 626 extends through an upper (as viewed in FIG. 16) end portion 646 of the cylinder 624.

The cylinder 624 may be connected with a lower portion of the press assembly 30 (FIG. 5) or connected with an upper portion of the press assembly. For example, the cylinder 624 could be connected with a stationary base of the press assembly. If the cylinder 624 is connected with the stationary base of the press assembly 30, the cushion assembly 620 would be disposed in the orientation illustrated in FIG. 16 with the piston 626 extending upward from the cylinder 624. Alternatively, the cylinder 624 could be associated with the movable slide plate 38 of the press assembly. If this is done, the orientation of the press cushion assembly 620 would be offset by 180° from the orientation illustrated in FIG. 16 so that the piston 626 would extend downward from the cylinder 624.

The head end portion 638 of the piston 626 includes a pair of flange members 650 and 652 which extend into an annular groove 654. Each of the flange members 650 and 652 has a semicircular configuration. The flange members 650 and 652 are disposed in a circular array having its center on the axis 642. It should be understood that the flange members 650 and 652 do not sealingly engage a cylindrical inner side surface 656 of the cylinder 624. One or more openings may be provided between the flange members 650 and 652.

The cylinder 624 cooperates with the piston 626 to define a variable volume main chamber 660. The main chamber 660 holds a fluid, such as nitrogen gas, under pressure. Of course, fluids other than nitrogen gas could be utilized.

The cylinder 624 includes a guide assembly 664 which guides movement of the piston 626 relative to the inner side surface 656 of the side wall 630 of the cylinder 624. The guide assembly 664 has a central axis which is coincident with the axis 642. The guide assembly 664 includes an annular metal guide ring 666 which engages a cylindrical outer side surface 667 of the rod end portion 640 of the piston 626. The guide ring 666 guides movement of the rod end portion 640 of the piston 626 relative to the cylinder 624.

An annular metal end cap 668 abuts the guide ring 666 and holds the guide ring in place in the cylinder 624 during reciprocation of the piston 626. An annular retainer ring 670 transmits force between the end cap 668 and the side wall 630 of the cylinder 624 to hold the end cap in place. Suitable annular seals 672, 674, 676, and 678 cooperate with the end cap 668 and guide ring 666 to prevent leakage of fluid from the cylinder 624.

When the cushion assembly 620 is in the extended condition illustrated in FIG. 16, the flange members 650 and 652 on the head end portion 638 of the piston 626 are pressed firmly against a stop member 684 by fluid pressure in the main chamber 660. Force is transmitted from the stop member through the guide ring 666 and end cap 668 to the cylindrical side wall 630 of the cylinder 624 through the annular retainer ring 670. The stop member 684 is formed by a rigid metal sleeve having a tubular cylindrical configuration. A central axis of the tubular stop member 684 is coincident with the axis 642.

An annular end surface 686 on the stop member 684 (FIG. 16) abuts an annular surface area on radially inner portions of the flange members 650 and 652. The end surface 686 on the stop member 684 and the flange members 650 and 652 cooperate to limit upward (as viewed in FIG. 16) movement of the piston 626 under the influence of fluid pressure in the main chamber 660. An upper end portion 688 of the cylindrical stop member 684 is fixedly connected with the guide ring 666.

In accordance with one of the features of the embodiment of the cushion assembly illustrated in FIG. 16, a body 692 of elastomeric material is disposed in an annular secondary chamber 694. The annular secondary chamber 694 extends around and is coaxial with the rod end portion 640 of the piston 626. The secondary chamber 694 is formed between a rigid metal annular force transmitting member 698 and the annular guide ring 666. The annular force transmitting member 698 is coaxial with and is pressed against the annular body 692 of elastomeric material by the flange members 650 and 652 on the head end portion 638 of the piston.

Although the body 692 of elastomeric material has a tubular cylindrical overall configuration and an annular cross-sectional configuration, it is contemplated that the body of elastomeric material could have a different configuration if desired. Of course, the secondary chamber 694 and force transmitting member 698 could have configurations which are different than the illustrated annular configuration. If desired, a plurality of force transmitting members could be provide to transmit force from the body 692 of elastomeric material to the head end portion 638 of the piston. For example, a plurality of rod-shaped force transmitting members could be utilized to transmit force from a plurality of separate bodies of elastomeric material or from a single body of elastomeric material. However, it is believed that it will be preferred to utilize the illustrated annular configuration of the body 692 of elastomeric material and force transmitting member 698 in order to provide the press cylinder assembly 620 with a compact construction.

If the body 692 of elastomeric material is formed with the preferred tubular configuration illustrated in FIGS. 16–20, it is contemplated that axially extending inner and/or outer side surfaces of the body of elastomeric material could have configurations other than the illustrated configurations. For example, the inner and outer side surfaces could be axially curved throughout the length of the side surfaces or adjacent axially opposite ends of the body 292 of elastomeric material. Thus, the inner side surface of the body 292 of elastomeric material could have arcuate surface areas which flare radially outward adjacent to axially opposite ends of the body of elastomeric material. Similarly, the outer side surface of the body 292 of elastomeric material could have arcuate surface areas which taper radially inward adjacent to axially opposite ends of the body of elastomeric material.

When the cushion assembly 620 is in the extended condition illustrated in FIG. 16, the tubular cylindrical body 692 of elastomeric material is axially compressed from its initial or free length by force applied against one end of the annular body of elastomeric material by the force transmitting member 698. The cylindrical stop member 684 extends around the rod end portion 640 of the piston 626 and is coaxial with the body 692 of elastomeric material and the flange members 650 and 652. The stop member 684 limits the extent of axial compression of the body 692 of elastomeric material.

The body 692 of elastomeric material has a substantially constant volume. Therefore, when the body 692 of elastomeric material is axially compressed from its initial or free configuration, as illustrated in FIG. 16, the body of elastomeric material expands radially. The body 692 of elastomeric material is sized so that radially outward expansion of the body of elastomeric material does not result in engagement of a cylindrical outer side surface 704 on the body of elastomeric material with the cylindrical inner side surface 656 on the side wall 630. Therefore, radial force components are not transmitted between the body 692 of elastomeric material and the side wall 630 of the cylinder 624 when the cushion assembly 620 is in the extended condition illustrated in FIG. 16.

When the cushion assembly 620 is in the extended condition of FIG. 16, the associated press assembly is in the open condition, similar to the condition illustrated in FIG. 5 for the press assembly 30. At this time, the fluid pressure in the main chamber 660 is effective to press the flange members 650 and 652 on the head end portion 638 of the piston 626 firmly against the annular end surface 686 on the stop member 684. The stop member 684 limits the extent of upward (as viewed in FIG. 16) movement of the head end portion 638 of the piston 626 under the influence of fluid pressure in the chamber 660.

The flange members 650 and 652 on the head end portion 638 of the piston 626 are firmly pressed against an annular lower (as viewed in FIG. 16) side surface 710 of the force transmitting member 698. The annular lower side surface 710 on the force transmitting member 798 engages the flange members 650 and 652 at a location radially outward from the location where the end surface 686 on the stop member 684 engages the flange members. Therefore, when the cushion assembly 620 is in the extended condition of FIG. 16, the fluid pressure in the chamber 660 is effective to press the flange members 650 and 652 on the head end portion 638 of the piston 626 against both the stop member 684 and force transmitting member 698. However, it is the stop member 684 which limits the extent of upward movement of the piston 626.

An annular upper side surface 712 on the force transmitting member 698 is pressed firmly against an annular lower side surface 716 on the body 692 of elastomeric material. This results in the body 692 of elastomeric material being compressed between the force transmitting member 698 and the guide ring 666 in the guide assembly 664. The body 692 of elastomeric material provides a biasing force which presses the force transmitting member 698 firmly against the head end portion 638 of the piston 626.

The forces applied against axially opposite ends of the body 692 of elastomeric material are effective to compress the body of elastomeric material in an axial direction, that is, in a direction parallel to the central axis 642 (FIG. 16) of the cushion assembly 620. However, the flange members 650 and 652 on the head end portion 638 of the piston 626 are also pressed firmly against the stop member 684 which limits the extent of axially upward (as viewed in FIGS. 16 and 19) movement of the piston 626. Of course, this limits the extent of axial compression of the body 692 of elastomeric material.

During axial compression of the body 692 of elastomeric material, the body of elastomeric material expands in a radially outward direction. The radial expansion of the body 692 of elastomeric material results in the total volume of the body of elastomeric material remaining constant as the body of elastomeric material is axially compressed. The cylindrical stop member 684 engages a cylindrical inner side surface 718 on the body 692 of elastomeric material to block radially inward expansion of the body of elastomeric material. Therefore, the body 692 of elastomeric material expands only in a radially outward direction as the body of elastomeric material is axially compressed. However, the inner side surface 718 could flare radially outward so as to provide some space between the cylindrical stop member 684 and inner side surface 718 when the cushion assembly is in the fully retracted condition of FIG. 18.

As was previously mentioned, when the cushion assembly 620 is in the extended condition of FIGS. 16 and 19, the cylinder outer side surface 704 of the body 692 of elastomeric material is spaced a relative small radial distance from the inner side surface 656 of the side wall 630. Therefore, the body 692 of elastomeric material is not effective to apply radially outward forces against the side wall 630 of the cylinder 624.

As the press assembly is operated from the open condition toward the closed condition, a downwardly moving upper member in the press assembly, connected with the slide plate 38 of the press 30, moves into engagement with the rod end portion 640 of the piston 626. As this occurs, force is transmitted from the upper member in the press assembly to the rod end portion 640 of the piston 626. This force initiates downward movement (as viewed in FIGS. 16 and 19) of the piston 626 and operation of the cushion assembly 620 from the extended condition of FIG. 16 toward the fully retracted condition of FIG. 18.

In accordance with one of the features of the present invention, throughout an initial portion of operation of the cushion assembly 620, that is, during operation of the cushion assembly from the extended condition of FIG. 16 to the partially retracted condition of FIG. 17, the body 692 of elastomeric material is effective to provide force which is applied against the head end portion 638 of the piston 626 by the force transmitting member 698. The force transmitted from the body 692 of elastomeric material to the piston 626 urges the piston away from the upper end portion 646 of the cylinder 624 against the influence of the fluid pressure in the chamber 660. Thus, the body 692 of elastomeric material provides a preload or biasing force which assists the press in operating the cushion assembly 620 from the extended condition toward the retracted condition.

In the press 30 of FIG. 5, the body 692 of elastomeric material assists the force transmitted from the flywheel 34 and crankshaft 36 through the slide plate 38 to the cushion assembly 620. The combined forces applied to the piston 626 by the press and the body 692 of elastomeric material move the piston downward (as viewed in FIG. 16) against the influence of the fluid pressure in the chamber 660.

The biasing force transmitted from the body 692 of elastomeric material to the head end portion 638 of the piston 626 tends to minimize shock loading on components of the press, such as the press 30 of FIG. 5, during operation of the cushion assembly 620 from the extended condition of FIG. 16 to the partially retracted condition of FIG. 17. This is because the magnitude of the force which must be applied to the cushion assembly 620 by the press upon initiation of operation of the cushion assembly from the extended condition of FIG. 16 is reduced by an amount corresponding to the magnitude of the biasing force transmitted from the elastomeric material 692 to the head end portion 638 of the piston 626 through the force transmitting member 698. Of course, reducing the force which is required to initiate movement of the piston 626 relative to the cylinder 624 reduces shock loading on the components of the press. The manner in which shock loading on components of the press assembly is reduced is the same as was previously explained in conjunction with FIGS. 1 through 15 herein.

As the piston 626 is moved into the chamber 660, the volume of the chamber is decreased and, therefore, the pressure of the fluid in the chamber is increased. Simultaneously therewith, the flange members 650 and 652 and force transmitting member 698 move downward (as viewed in FIG. 16) away from the upper end portion 646 of the cylinder 624. As this occurs, the body 692 of elastomeric material expands axially and contracts radially. Radial contraction of the body 692 of elastomeric material reduces the diameter of the cylindrical outer side surface 704 on the body of elastomeric material. The force which is transmitted from the body of elastomeric material 692 through the force transmitting member 698 to the head end portion 638 of the piston 626 decreases as the body 692 of elastomeric material expands toward its initial or free condition. As the body 692 of elastomeric material expands axially, a cylindrical inner side surface on the body of elastomeric material moves along a cylindrical outer side surface of the stop member 684.

At the end of the initial movement of the piston 626 relative to the cylinder 624 (FIG. 17), an annular flange 722 (FIG. 19) on the force transmitting member 698 moves downward into engagement with an annular flange 724 on the stop member 784 (FIG. 20). Thus, during initial operation of the cushion assembly 620 from the extended condition of FIGS. 16 and 19 to the partially retracted condition of FIG. 17, the force transmitting member 698 moves axially downward (as viewed in FIGS. 16 and 19) to the position shown in FIG. 17. During operation of the cushion assembly 620 from the extended condition of FIG. 16 to the partially retracted condition of FIG. 17, the force transmitting member 698 moves through an axial distance which is between three and fifty percent (3 and 50%) of the total distance which the head end portion 638 of the piston 626 moves between the extended position of FIG. 16 and the fully retracted position of FIG. 18.

At the end of the initial operation of the press cushion assembly 620 from the extended condition (FIG. 16) to the partially retracted condition of FIG. 17, the annular flange 722 on the upper end portion of the force transmitting member 698 is disposed in abutting engagement with an annular flange 724 (FIG. 20) on the stop member 684. At this time, the annular body 692 of elastomeric material has expanded axially and contracted radially from the compressed condition of FIG. 16 to or almost to its initial or unrestrained condition illustrated in FIG. 17. The initial shock loading on the components of the press assembly will have been at least partially dissipated by compression of the fluid (nitrogen gas) in the cylinder chamber 660. The magnitude of the initial shock on the components of the press assembly will have been reduced due to the assistance provided by force transmitted from the body 692 of elastomeric material to the head end portion 638 of the piston 626.

When the cushion assembly 620 is in the partially retracted condition of FIG. 17, the body 692 of elastomeric material is held between the force transmitting member 698 and the guide ring 666. At this time, the body 692 (FIG. 17) of force transmitting material has an axial extent which is equal to or only slightly less than the axial extent of the body 692 of the body of elastomeric material when the body is in an unrestrained or free condition. The upper end portion 688 of the stop member 684 is fixedly connected with the guide ring 666. The annular flange 724 on the lower end portion of the stop member 684 has an annular motion limiting surface which is disposed in abutting engagement with an annular flange 722 of the force transmitting member 698. Therefore, the force transmitting member 698 is held in the position shown in FIG. 20 and axial movement of the body 692 of elastomeric material is blocked.

As the press assembly continues to operate from the open condition toward the closed condition, the piston 626 is forced downward from the partially retracted position shown in FIG. 17 to the fully retracted position shown in FIG. 18. As this occurs, the body 692 of elastomeric material and force transmitting member 698 remain stationary relative to the cylinder 624. The fluid in the chamber 660 is further compressed by the head end portion 638 of the piston 626 to further cushion operation of the press assembly from the open condition to the closed condition.

It should be understood that, ignoring transient dynamic conditions, the fluid pressures on opposite sides of the flange members 650 and 652 are the same when the cushion assembly 620 is in the fully retracted condition of FIG. 18. This is because the flange members 650 and 652 are not disposed in sealing engagement with the inner side surface 656 of the side wall 630 of the cylinder 624. The force transmitting member 710 and body 692 of elastomeric material are exposed to the fluid pressure in the chamber 660. However, the body 692 of elastomeric material is effective to hold the flange 722 on the force transmitting member 698 in abutting engagement with the flange 724 on the stop member 684 (FIG. 20).

The effective cross sectional area of the piston 626 in compressing the gas in the chamber 660 is equal to the circular cross sectional area of the cylindrical rod end portion 640 of the piston. However, it is contemplated that the piston 626 could have a different construction. For example, the head end portion 638 of the piston could be constructed so as to sealingly engage the inner side surface 656 of the side wall 630 of the cylinder 624. Of course, this will result in the piston 626 having a larger effective area to compress the fluid in the chamber 660.

If desired, the flange members 650 and 652 could be omitted. The head end portion 638 of the piston 626 could be integrally formed as one piece with the rod end portion 640 of the piston. If this is done, suitable seal elements may or may not be provided between the head end portion 638 of the piston 626 and the inner side surface 656 of the cylinder 624.

After the press assembly has been operated to the closed condition and a metal workpiece deformed by dies in the press assembly, the press assembly is operated from the closed condition back to the open condition. Operating the press assembly to the open condition facilitates removal of the workpiece from the press assembly. As the press assembly is operated to the open condition, the cushion assembly 620 is operated from the fully retracted condition of FIG. 18 to the extended condition of FIG. 16 under the influence of the fluid pressure in the main chamber 660.

During operation of the press assembly from the closed condition toward the open condition, the piston 626 moves upward (as viewed in FIG. 18) relative to the cylinder 624. As this occurs, the flange members 650 and 652 move toward the annular force transmitting member 698 under the influence of fluid pressure applied against the head end portion 638 of the piston 626. As the piston 626 moves upward (as viewed in FIG. 18) relative to the cylinder 624, the flange members 650 and 652 move into initial engagement with the force transmitting member 698 (FIG. 17). At this time, force is being transmitted between the rod end portion 640 of the cushion assembly 620 and the upper member or slide plate 38 (FIG. 6) of the press assembly.

Upon engagement of the flange members 650 and 652 with the force transmitting member 698 (FIG. 17), axial compression of the body 692 of elastomeric material is initiated. As the body 692 of elastomeric material is axially compressed, the volume of the body 692 of elastomeric material remains constant. Therefore, the cylindrical outer side surface 704 of the body 692 of elastomeric material expands radially outward toward the inner side surface 656 of the cylindrical side wall 630. As the body 692 of elastomeric material 684 is compressed axially, the cylindrical inner side surface on the body of elastomeric material moves along the cylindrical outer side surface of the stop member 684.

The force required to compress the body 692 of elastomeric material reduces shock loading on components of the cushion assembly 620 as the cushion assembly 620 operates to the extended condition of FIG. 16. As the body 692 of elastomeric material is axially compressed and radially expanded, the body 692 of elastomeric material absorbs some of the kinetic energy of the piston 626. This stored or potential energy will, on the next cycle of operation of the press assembly, be used to assist the press assembly in operating the cushion assembly 620 from the extended condition of FIG. 16 back toward the retracted condition of FIG. 18. Thus, the body 692 of elastomeric material stores energy which is subsequently released to assist the press assembly in operating the cushion assembly 620 to thereby reduce shock loading on components of the press assembly upon initiation of operation of cushion assembly from the extended condition toward the retracted condition.

The foregoing description of the mode of operation of the cushion assembly 620 has assumed that the cushion assembly is connected with a member in a lower portion or base of the press assembly and is axially compressed by engagement with a member in an upper or movable portion of the press assembly. However, it is contemplated that the cushion assembly 620 could be mounted on a movable upper member of the press assembly and engage a stationary lower member in the base of the press assembly. If this was done, the orientation of the cushion assembly would be changed by 180° from the orientation illustrated in FIG. 16.

When the cushion assembly 620 is mounted on a movable member in the upper portion of a press, the rod end portion 640 of the piston 626 would extend downward from the cylinder 624. The cylinder 624 would be fixedly connected with the movable member in the upper portion of the press. The rod end portion 640 of the piston 626 would move into engagement with a member in the lower or base portion of the press assembly.

It is contemplated that the body 692 of elastomeric material could have many different compositions. Thus, the body 692 of elastomeric material could be a cast elastomer or thermoplastic material. The body 692 may be a urethane based material. It is believed that it may be preferred to use a polyurethane formulated with "HYLENE" (trademark)-PPDI (p-phenylene diisocyanate). Thermoplastic materials based on p-phenylene diisocyanate have mechanical properties which enable the materials to withstand severe distortion over a relatively wide range of operating temperatures. The body 692 of elastomeric material has a Bayshore rebound percentage of forty to seventy percent (40 to 70%) and Shore A hardness number of 90. Although it is preferred to use a polyurethane which is p-phenylene diisocyanate based, it is contemplated that the body 692 of elastomeric material could have a different composition if desired. For example, the body 692 could be formed of urethane.

The body 692 of elastomeric material expands through an axial distance which varies as a function of the size of the cushion assembly 620 and the distance which the piston 626 moves relative to the cylinder 624. Depending on the size of the cushion assembly 620 and the press with which the cushion assembly is used, during operation of the cushion assembly 620 from the extended condition of FIG. 16 to the fully retracted condition of FIG. 18, the piston 626 may move through a distance between 0.900 of an inch and 7.0 inches relative to the side wall 630 of the cylinder 624. Depending upon the distance which the piston 626 is moved relative to the side wall 630 of the cylinder 624, the body 692 of elastomeric material is effective to apply force to the head end portion 638 of the piston 626 during at least three percent (3%) and less than fifty percent (50%) of the movement of the piston 626 between the extended condition (FIG. 16) and the fully retracted condition (FIG. 18). Of course, the specific percentage of the movement of the piston during which force is applied by the body 692 of elastomeric material will depend upon the specific construction of the cushion assembly 620 and the construction of the press with which the cushion assembly is used.

When the cushion assembly 620 is in the fully retracted condition of FIG. 18, the body 692 of elastomeric material has an axial extent (length) which is twenty percent (20%) or more greater than the axial extent (length) of the body of elastomeric material when the cushion assembly is in the extended condition of FIG. 16. Thus, if the body 692 of elastomeric material has a length of 1.00 inches when the cushion assembly 620 is in the extended condition of FIG. 16, the body of elastomeric material will have a length of 1.20 inches or more when the cushion assembly 620 is in the fully retracted condition of FIG. 18.

The extent of axial compression and subsequent expansion of the body 692 of elastomeric material will determine the extent of operation of the press assembly during which the body of elastomeric material is effective to provide force urging the piston 626 toward the retracted condition. In order to minimize operating loads to which the press is subjected, it is believed that it will be preferred to have thirty-five to forty-five percent (35 to 45%) axial expansion of the body 692 of elastomeric material during operation of the cushion assembly 620 from the extended condition (FIG. 16) to the fully retracted condition. Thus, if the body 692 of elastomeric material has a length of 1.00 inches when the cushion assembly is in the extended condition of FIG. 16, the body of elastomeric material will have a length of between 1.35 and 1.45 inches when the cushion assembly is in the fully retracted condition of FIG. 18.

The specific axial extent or length of the body 692 of elastomeric material will vary depending upon the desired operating characteristics of the cushion assembly 620. However, it is believed that it may be desired to provide the body 692 of elastomeric material with an unrestrained axial extent of between 0.600 inches and 1.500 inches, as measured along the longitudinal axis 642, when the cushion assembly 620 is in the fully retracted condition of FIG. 18. It is also believed that the body 692 of elastomeric material may have an axial extent of between 0.350 and 1.200 inches when the cushion assembly 620 is in the extended condition of FIG. 16. It should be understood that the axial extent of the body 692 of elastomeric material may differ from these specific dimensions. However, it is believed that these specific dimensions may result in the body 692 of elastomeric material being able to provide the force required for desired shock absorbing characteristics for a specific cushion assembly.

When the cushion assembly 620 is in the extended condition of FIG. 16, the axially compressed body 692 of elastomeric material applies a force which is at least as great as thirty-five percent (35%) of the fluid force supplied against the head end portion 638 of the piston by the fluid pressure in the chamber 660. It is believed that it may be preferred to have the force which is transmitted from the body 692 of elastomeric material to the head end portion of the piston 638 be equal to or less than eighty percent (80%) of the force applied against the head end portion 638 of the piston 626 by the fluid pressure in the chamber 660. Thus, when the cushion assembly is in the extended condition of FIG. 16, the force transmitted from the body 692 of elastomeric material to the head end portion 638 of the piston 626 is between thirty-five and eighty percent (35 and 80%) of the force applied against the head end portion 638 of the piston 626 by the fluid pressure in the chamber 660.

Of course, some force is transmitted from the head end portion 638 of the piston 626 through the stop member 684 to the guide ring 666 and the side wall 630 of the cylinder 624 when the cushion assembly 620 is in the extended condition. Thus, a portion of the fluid pressure force in the chamber 660 is transmitted from the head end portion 638 of the piston 626 to the body 692 of elastomeric material through the force transmitting member 698. Another portion of the fluid pressure force is transmitted from the head end portion 638 of the piston 626 through the stop member 684 to the guide ring 666 and side wall 630 of the cylinder 624.

When the cushion assembly 620 is in the extended condition of FIG. 16, the fluid pressure in the chamber 660 is at least seven hundred pounds per square inch (700 psi) and is less than two thousand seven hundred pounds per square inch (2,700 psi). Of course, when the cushion assembly 620 is operated from the extended condition of FIG. 16 to the retracted condition of FIG. 18, the fluid pressure in the chamber 660 increases as the piston 626 moves into the chamber. It should be understood that some cushion assemblies constructed in accordance with the present invention may operate with fluid pressures which are different than these specific pressures.

It should be understood that the foregoing specific numerical characteristics and composition of components of the cushion assembly 620 and for the pressure in the chamber 660 have been set forth herein for a specific range of embodiments of the invention. It is contemplated that, depending upon the specific characteristics of a press assembly in which the cushion assembly 620 is utilized, the characteristics of the cushion assembly may be somewhat different than the specific characteristics previously set forth herein. However, it is believed that it may be preferred to construct the cushion assembly with the specific characteristics set forth herein in order to optimize the operation of the cushion assembly with at least some known press assemblies.

In the foregoing description, the body 692 of elastomeric material has provided a biasing force which is transmitted to the head end portion 638 of the piston 626 through the force transmitting member 698. It should be understood that the biasing force which is transmitted from the body 692 of elastomeric material to the head end portion 638 of the piston could be transmitted directly from the body of elastomeric material as described in conjunction with the embodiment of the invention illustrated in FIGS. 7 and 9. Although it is believed that it may be preferred to use a body 692 of elastomeric material to provide the biasing force, it should be understood that the biasing force could be provided in a different manner, for example, by spring discs, as illustrated in FIG. 10, or a helical spring as illustrated in FIG. 11, or by a body of fluid under pressure, as illustrated in FIG. 12.

It is contemplated that the dimensions of the body 692 of elastomeric material will vary as a function of the size of the cushion assembly 620 and as a function of the magnitude of force applied against the cushion assembly during operation of the press assembly. It is presently contemplated that the body 692 of elastomeric material may be associated with cushion assemblies having pistons 626 which move through distances of 0.900 inches or more and through distances of 7.00 inches or less during operation of the cushion assemblies from the extended condition (FIG. 16) to the fully retracted condition (FIG. 18). Of course, the specific distance through which the piston 626 moves will vary as a function of the size of the cushion assembly 620 and may be different than the foregoing distances.

In a first specific embodiment of the invention, the body 692 of elastomeric material was compressed by thirty-five percent (35%) when the cushion assembly 620 was in the extended condition. For this one specific embodiment of the invention, the body 692 of elastomeric material had the following dimensions.

|  | Uncompressed (Fully Retracted) |  | Compressed (Extended) |
|---|---|---|---|
| OD | 2.846 inches | OD | 3.130 inches |
| ID | 2.224 inches | ID | 2.224 inches |
| Length | 0.678 inches | Length | 0.441 inches |

When the cushion assembly was operated from the fully retracted condition of FIG. 18 to the extended condition of FIG. 16, the piston 626 moved through a distance of approximately two inches (2.0 inches) and the axial extent (length) of the body of elastomeric material decreased by 0.237 inches or 35%. In addition, the outside diameter (OD) increased and the inside diameter (ID) remained constant.

In a second specific embodiment of the invention, the body 692 of elastomeric material was compressed by forty percent (40%) when the cushion assembly was in the extended condition. The second embodiment of the body of elastomeric material was used in a cushion assembly having the same size as the cushion assembly in which the first embodiment of the body of elastomeric material was used. For the second specific embodiment of the invention, the body 692 of elastomeric material had the following dimensions:

|  | Uncompressed (Fully Retracted) |  | Compressed (Extended) |
|---|---|---|---|
| OD | 2.803 inches | OD | 3.130 inches |
| ID | 2.224 inches | ID | 2.224 inches |
| Length | 0.678 inches | Length | 0.407 inches |

When the cushion assembly was operated from the fully retracted condition of FIG. 18 to the extended condition of FIG. 16, the piston 626 moved through a distance of approximately two inches (2.0 inches) and the axial length of the body of elastomeric material decreased by 0.271 inches or 40%. In addition, the outside diameter (OD) increased and the inside diameter (ID) remained constant.

In a third specific embodiment of the invention, the body 692 of elastomeric material was larger than the first and second embodiments and was compressed by thirty-five percent (35%) when the cushion assembly was in the extended condition. The cushion assembly in which the third embodiment of the body 692 of elastomeric material was used was larger than the cushion assembly in which the first and second embodiments were used. For the third specific embodiment of the invention, the body 692 of elastomeric material had the following dimensions:

|  | Uncompressed (Fully Retracted) |  | Compressed (Extended) |
|---|---|---|---|
| OD | 4.495 inches | OD | 4.921 inches |
| ID | 3.571 inches | ID | 3.571 inches |
| Length | 1.459 inches | Length | 0.948 inches |

When the cushion assembly was operated from the fully retracted condition of FIG. 18 to the extended condition of FIG. 16, the piston 626 moved through a distance of approximately two inches (2.0 inches) and the axial length of the body of elastomeric material decreased by 0.511 inches or 35%. In addition, the outside diameter (OD) increased and the inside diameter (ID) remained constant.

In a fourth specific embodiment of the invention, the body 692 of elastomeric material was compressed by forty percent (40%) when the cushion assembly was in the extended condition. The fourth embodiment of the body 692 of elastomeric material was used in a cushion assembly having the same size as the cushion assembly in which the third embodiment of the body of elastomeric material was used. For the fourth specific embodiment of the invention, the body 692 of elastomeric material had the following dimensions:

|  | Uncompressed (Fully Retracted) |  | Compressed (Extended) |
| --- | --- | --- | --- |
| OD | 4.431 inches | OD | 4.921 inches |
| ID | 3.571 inches | ID | 3.571 inches |
| Length | 1.459 inches | Length | 0.875 inches |

When the cushion assembly was operated from the fully retracted condition of FIG. 18 to the extended condition of FIG. 16, the piston 626 moved through a distance of approximately two inches (2.0 inches) and the axial length of the body of elastomeric material decreased by 0.584 inches or 40%. In addition, the outside diameter (OD) increased and the inside diameter (ID) remained constant.

The foregoing specific examples of the body 692 of elastomeric material were used with two different sizes of cushion assemblies. The first and second embodiments of the body of elastomeric material were used with a cushion assembly having the same general construction as a commercially available T2-3000 cushion assembly. The third and fourth embodiments of the body of elastomeric material were used with a cushion assembly having the same general construction as a commercially available T2-7500 cushion assembly. The T2-3000 and T2-7500 cushion assemblies had pistons which were movable through a maximum possible distance of approximately four inches (4.0 inches). However, the pistons were actually moved through a distance of two inches (2.0 inches). The T2-300 and T2-7500 cushion assemblies are commercially available from Teledyne Fluid Systems, Hyson Products, 10367 Brecksville Road, Brecksville, Ohio 44141. Of course, the body 692 of elastomeric material may be used with cushion assemblies having a construction which is different than the construction of the aforementioned commercially available cushion assemblies.

The amount of force which is transmitted from the body 692 of elastomeric material varies as a direct function of the extent of compression of the body of elastomeric material when the cushion assembly 620 is operated from the fully retracted condition of FIG. 18 to the extended condition of FIG. 16. It is believed that it will be desired to have a force of a magnitude which results from a compression of twenty percent (20%) or more in an axial or lengthwise direction of the body 692 of elastomeric material. It is believed that a compression of thirty-five to forty-five percent (35 to 45%) in an axial or lengthwise direction of the body 692 of elastomeric material may enhance the shock absorbing capabilities of the cushion assembly 620 and provide desired operating characteristics. Although the four specific examples of the body 692 of elastomeric material related to axial compression of 35% or 40%, it is contemplated that different extents of axial compression may be used.

A press cushion assembly 820 (FIGS. 21 and 22) has the same general construction and mode of operation as the press cushion assembly 620 of FIGS. 16–20. The press cushion assembly 820 is operable from an extended condition, illustrated in FIG. 21 through a partially retracted condition to a fully retracted condition, illustrated in FIG. 22. The extended condition of the cushion assembly 820 (FIG. 21) corresponds to the extended condition of the cushion assembly 620 (FIG. 16). The retracted condition of the cushion assembly 820 (FIG. 22) corresponds to the retracted condition of the cushion assembly 620 (FIG. 18).

During operation of the press cushion assembly 820 from the extended condition to the retracted condition, the press cushion assembly provides a yieldable force opposing movement of one member in a press assembly, for example the slide plate 38 of FIG. 5, relative to another member in the press assembly, for example, the die 40. Of course, the press cushion assembly 820 could be used with other components of a press assembly.

The cushion assembly 820 includes a cylinder 824 (FIG. 21) and a piston 826. The cylinder 824 includes a cylindrical sidewall 830 and a circular end wall (not shown) corresponding to the end wall 632 of the cylinder 624 of FIG. 16. The piston 826 includes a head end portion 838 and a rod end portion corresponding to the rod end portion 640 of FIG. 16. The rod end portion of the piston 826 of FIG. 21 has a cylindrical configuration and is coaxial with a central axis of the press cushion assembly 820. The rod end portion of the piston 826 extends through an upper (as viewed in FIG. 21) end portion of the cylinder 824.

The cylinder 824 may be connected with a lower portion of the press assembly 30 (FIG. 5) or connected with an upper portion of the press assembly. For example, the cylinder 824 could be connected with a stationary base of the press assembly. If the cylinder 824 is connected with the stationary base of the press assembly, the cushion assembly 820 would be disposed in the orientation illustrated in FIGS. 21 and 22 with the piston 826 extending upward from the cylinder 824. Alternatively, the cylinder 824 could be associated with the movable slide plate 38 of the press assembly. If this is done, the orientation of the press cushion assembly 820 would be offset by 180° from the orientation illustrated in FIGS. 21 and 22 so that the piston 826 extends downward from the cylinder 824.

The head end portion 838 of the piston includes a pair of flange members 850 which extend into an annular groove 854. Each of the flange members 850 has a semi-circular configuration. The flange members 850 are disposed in a circular array in the same manner as previously described in conjunction with the flange members 650 and 652 of FIGS. 16–20. It should be understood that the flange members 850 do not sealingly engage a cylindrical inner side surface 856 of the cylinder 824. One or more openings may be provided between the flange members 850.

The cylinder 824 cooperates with the piston 856 to define a variable volume main chamber 860. The main chamber 860 holds a fluid, such as nitrogen gas, under pressure. Of course, fluids other than nitrogen gas could be utilized.

Figure 21:
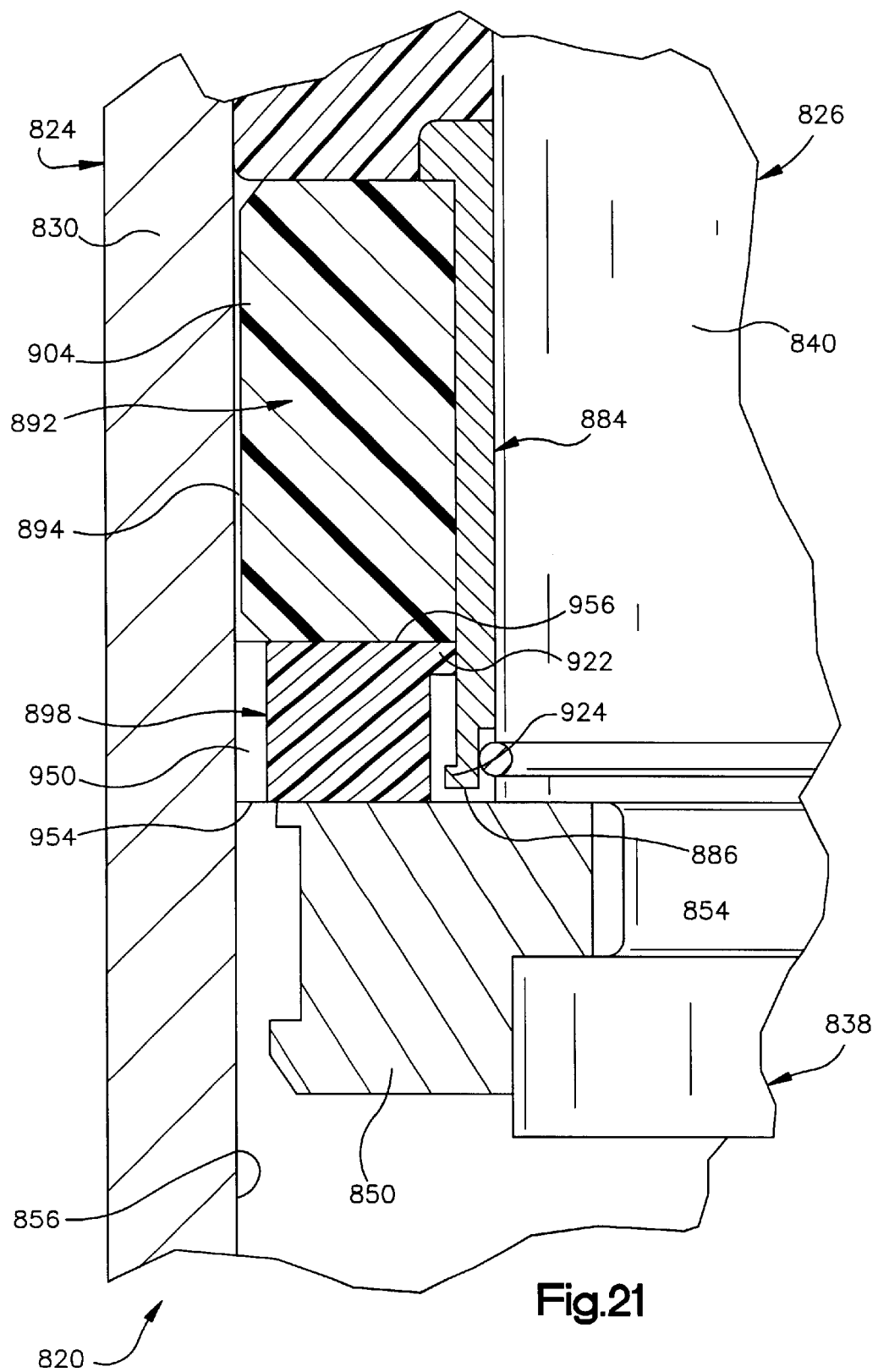
FIG. 21 is an enlarged fragmentary sectional view of a portion of another cushion assembly constructed in accordance with the present invention, the cushion assembly being illustrated in an extended condition.

When the cushion assembly 820 is in the extended condition illustrated in FIG. 21, the flange members 850 on the head end portion 838 of the piston 826 are pressed firmly against a stop member 864 by fluid pressure in the main chamber 860. The stop member 864 has the same construction as the stop member 664 of FIGS. 16–20 and is connected with a rod end portion of the cylinder 824 in the same manner as previously described in conjunction with the embodiment of the invention illustrated in FIGS. 16–20. A force is transmitted from the stop member 864 (FIG. 21) to the rod end portion of the cylinder 824 in the manner previously explained in conjunction with the embodiment of the invention illustrated in FIGS. 16–20. The stop member 864 is formed by a ridged metal sleeve having a tubular cylindrical configuration. A central axis of the tubular stop member 864 is coincident with a central axis of the press cushion assembly 820.

An annular end surface 886 on the stop member 884 (FIG. 21) abuts an annular surface area on radially inner portions of the flange members 850. The end surface 886 on the stop member 884 and the flange members 850 cooperate to limit upward (as viewed in FIG. 21) movement of the piston 826 under the influence of fluid pressure in the main chamber 860. An upper end portion of the cylindrical stop member 884 is fixedly connected with the rod end portion of the cylinder 824.

A body 892 of elastomeric material is disposed in an annular secondary chamber 894. The annular secondary chamber 894 extends around and is coaxial with a cylindrical rod portion 840 of the piston 826. The secondary chamber 894 is formed between an annular force transmitting or wall member 898 and a rod end portion of the cylinder 824 in the same manner as previously described in conjunction with the embodiment of the invention illustrated in FIGS. 16–20. The annular force transmitting member 898 is coaxial with and is pressed against the annular body 892 of elastomeric material by the flange members 850 on the head end portion 838 of the piston 826.

When the cushion assembly 820 is in the extended condition illustrated in FIG. 21, the tubular cylindrical body 892 of elastomeric material is axially compressed from its initial or free length by force applied against one end of the annular body in the elastomeric material by the force transmitting member 898. The cylindrical stop member 884 extends around the rod portion 840 of the piston 826 and is coaxial with the body 892 of elastomeric body and the flange members 850. The stop member 884 limits the extent of axial compression of the body 892 of elastomeric material.

The body 892 of elastomeric material has a substantially constant volume. Therefore, when the body 892 of elastomeric material is axially compressed from its initial or free configuration, as illustrated in FIG. 21, the body of elastomeric material expands radially. The body 892 of elastomeric material is sized so that radially outward expansion of the body of elastomeric material does not result in engagement of a cylindrical outer side surface 904 on the body of elastomeric material with the cylindrical inner side surface 856 on the sidewall 830. Therefore, radial force components are not transmitted between the body 892 of elastomeric material and the sidewall 830 of the cylinder 824 when the cushion assembly 820 is in the extended condition illustrated in FIG. 21.

As the press assembly is operated from the open condition toward the closed condition, a downwardly moving upper member in the press assembly, connected with the slide plate 38 of the press 30, moves into engagement with the rod portion 840 of the piston 826. As this occurs, force is transmitted from the upper member of the press assembly to the rod portion 840 of the piston 826. This force initiates downward movement (as viewed in FIGS. 21 and 22) of the piston 826 and operation of the cushion assembly 820 from the extended condition of FIG. 21 toward the fully retracted condition of FIG. 22.

Throughout an initial portion of operation in the cushion assembly 820, the body 892 of elastomeric material is effective to provide force which is applied against the head end portion 838 of the piston 826 by the force transmitting member 898. The force transmitted from the body 892 of elastomeric material to the piston 826 urges the piston away from the upper end portion of the cylinder 824 against the influence of fluid pressure in the chamber 860. Thus, the body 892 of elastomeric material provides a preload or biasing force which assists the press in operating the cushion assembly 820 from the extended condition toward the retracted condition.

As the piston 826 is moved into the main chamber 860, the volume of the main chamber is decreased. At the same time, the force transmitting member 898 moves axially downward from the position illustrated in FIG. 21 to the position illustrated in FIG. 22 and the volume of the secondary chamber 894 increases. As this occurs, the body 892 of elastomeric material expands axially and contracts radially. Radial contraction of the body 892 of elastomeric material reduces the diameter of the cylindrical outer surface 904 of the body of elastomeric material. The force which is transmitted from the body of elastomeric material 892 through the force transmitting member 898 to the head end portion 838 of the piston 826 decreases as the body 892 of elastomeric material expands toward its initial free condition. As the body 892 of elastomeric material expands axially, a cylindrical inner side surface on the body of elastomeric material moves along a cylindrical outer side surface of the stop member 884.

After the press assembly has been operated to the closed condition and a metal work piece deformed by dies in the press assembly, the press assembly is operated from the closed condition back to the open condition. Operating the press assembly to the open condition facilitates removal of the work piece from the press assembly. As the press assembly is operated to the open condition, the cushion assembly 820 is operated from the fully retracted condition of FIG. 22 to the extended condition of FIG. 21 under the influence of fluid pressure in the main chamber 860.

During operation of the press assembly from the closed condition toward the open condition, the piston 826 moves upward (as viewed in FIG. 22) relative to the cylinder 824. As this occurs, the flange members 850 (FIG. 21) move toward the annular force transmitting member 898 under the influence of fluid pressure applied against the head end portion 838 of the piston 826. As the piston 826 moves upward (as viewed in FIGS. 21 and 22) relative to the cylinder 824, the flange members 850 move into initial engagement with the force transmitting member 898 (FIG. 21). At this time, force is transmitted between the rod end portion 840 of the cushion assembly and the upper member or slide plate 38 (FIG. 6) of the press assembly.

Upon engagement of the flange members 850 with the force transmitting member 898 (FIG. 21) axial compression of the body 892 of elastomeric material is initiated. As the body 892 of elastomeric material is axially compressed, the volume of the body 892 of elastomeric material remains constant. Therefore, the cylindrical outer side surface 904 of the body 892 of elastomeric material expands radially outward toward the inner side surface 856 of the cylindrical side wall 830 of the cylinder 824. As the body 892 of elastomeric material 884 is compressed axially, the cylindrical inner side surface on the body of elastomeric material moves along the cylindrical outer side surface of the stop member 884.

Figure 22:
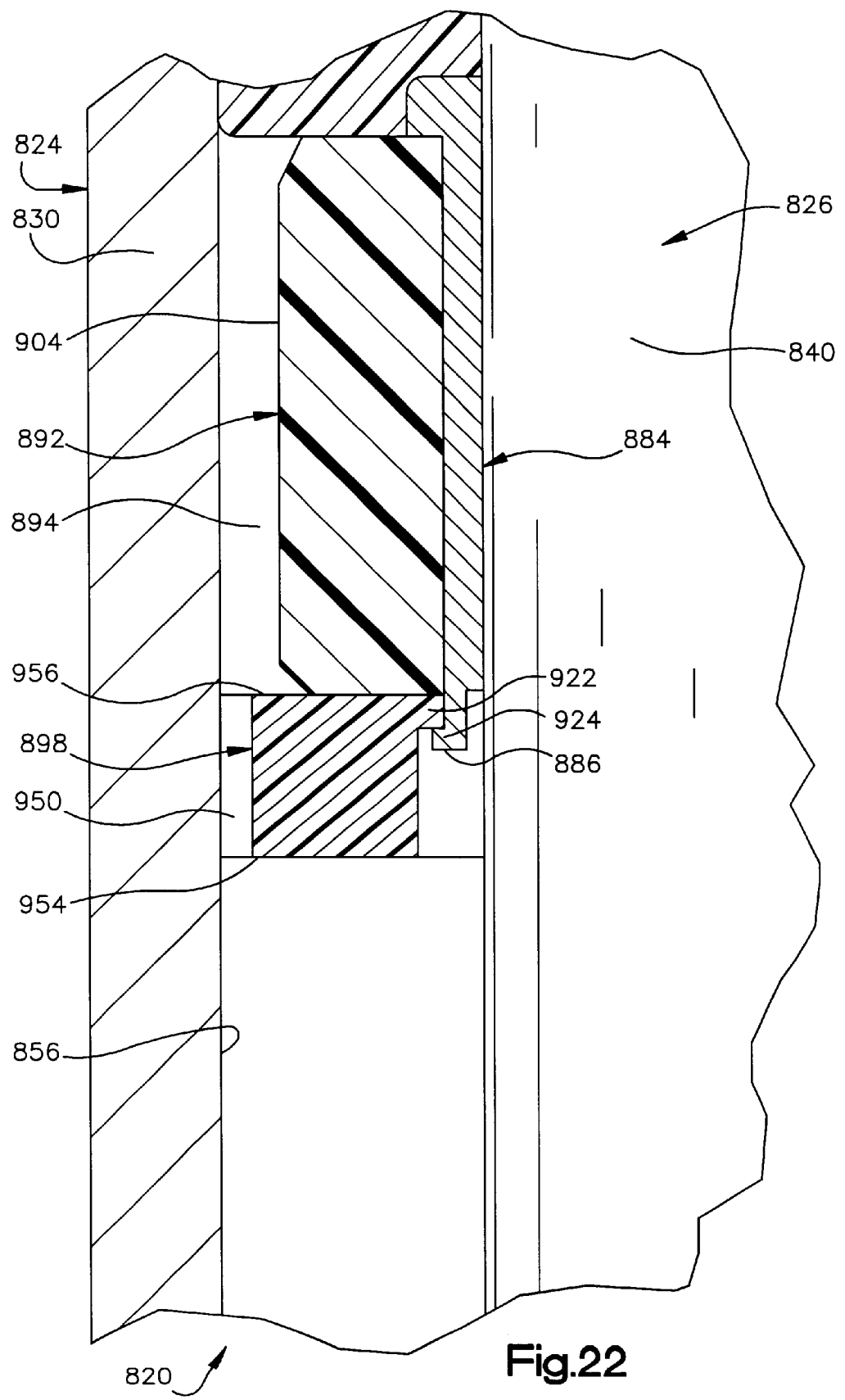
FIG. 22 is an enlarged fragmentary sectional view, generally similar to FIG. 21, illustrating the cushion assembly in the retracted condition.

As the press cushion assembly 820 is operated from the retracted condition of FIG. 22 to the extended condition of FIG. 21, the volume of the secondary chamber 894 decreases. At the same time, the body 892 of elastomeric material expands radially outward in the chamber 894. As the volume of the secondary chamber 894 decreases, the fluid (nitrogen gas) is forced from the secondary chamber by force applied against the fluid by the body of elastomeric material 892. The fluid flows from the secondary chamber 894 into the main chamber 860.

When the press cushion assembly 820 is operated from the extended condition of FIG. 21 back to the retracted condition of FIG. 22, the volume of the secondary chamber 894 increases. As this occurs, fluid flows from the main chamber 860 into the secondary chamber 894. This fluid flow is induced, in part at least, by the fact that the fluid pressure in the main chamber 860 is increasing due to downward (as viewed in FIG. 21) movement of the piston 826 and due to the reduction in the fluid pressure in the secondary chamber 894 as a result of expansion of the secondary chamber.

In order to accommodate fluid flow between the main chamber 860 and the secondary chamber 894, the force transmitting member 698 of FIGS. 16–20 has a cylindrical outer side surface which has a diameter which is less than the diameter of a cylindrical inner side surface 656 of the cylinder 624. This results in an annular gap being formed between the force transmitting member 698 and the cylinder 624 to accommodate the flow of gas into and out of the secondary chamber 694 as the secondary chamber expands and contracts.

In one specific embodiment, the cylindrical inner side surface 656 of the cylinder 624 had a diameter which exceeds a diameter of a cylindrical radially outer side surface on the force transmitting or end wall member 698 by a distance of 0.002 to 0.030 inches. Assuming that the force transmitting or end wall member 698 is precisely coaxial with the cylinder 624, there would be a radial gap between the inner side surface 656 of the cylinder 624 and the outer side surface of the force transmitting or wall member 698 of 0.001 to 0.015 inches.

In the embodiment of the invention illustrated in FIGS. 21 and 22, passages 950 are formed in a portion of the force transmitting or wall member 398 (FIG. 23, 24 and 25). The passages 950 are disposed in the periphery of the force transmitting or wall member 898. The passages 950 extend between flat axially opposite side surfaces 954 and 956 on the force transmitting member 898. The passages 950 conduct fluid flow between the secondary chamber 894 and the main chamber 860 during operation of the press cushion assembly 820 between the extended and retracted conditions of FIGS. 21 and 22. The passages 898 may have either a rectangular or arcuate configuration as viewed in a plane extending perpendicular to a central axis of the force transmitting member 898.

When the cushion assembly 820 is operated from the extended condition of FIG. 21 to the retracted condition of FIG. 22, the body 892 of elastomeric material contracts radially and expands axially. As this occurs, the force transmitting member 898 is moved downward (as viewed in FIGS. 21 and 22). Downward movement of the force transmitting member 898 and axial expansion of the body of elastomeric material 892 is interrupted by engagement of a flange 922 on the force transmitting member 828 with a flange 924 on the stop member 824. Engagement of the two annular flanges 922 and 924 is effective to block further movement of the force transmitting member 898 relative to the stop member 884 and cylinder 824.

As the force transmitting member 898 moves downward from the position illustrated in FIG. 21 toward the position illustrated in FIG. 22, the cylindrical outer side surface 904 of the body 892 of elastomeric material moves away from the cylindrical inner side surface 856 of the cylinder 824. This results in the secondary chamber 894 expanding from the relatively small size illustrated in FIG. 21 to the relatively large size illustrated in FIG. 22. As the secondary chamber 894 expands, fluid flows from the main chamber 860 through the passages 950 to the secondary chamber. Therefore, there is a relatively small fluid pressure differential between the main chamber 860 and the secondary chamber 894 during expansion of the secondary chamber.

When the cushion assembly 820 is operated from the retracted condition of FIG. 22 back to the extended condition of FIG. 21, the flange members 850 on the head end portion 838 of the piston 826 move into engagement with the force transmitting member 898. Force is transmitted from the head end portion 838 of the piston 826 to the force transmitting member 898. This force is transmitted from the force transmitting member 898 to the body 892 of elastomeric material. As the head end portion 838 of the piston 826 moves upward under the influence of the fluid pressure in the chamber 860, the flange 922 on the force transmitting member 898 is moved away from the flange 924 on the stop member 884. A this occurs, the size of the secondary chamber 894 is reduced. As the size of the secondary chamber 894 is reduced, the body 892 of elastomeric material contracts in an axial direction and expands in a radial direction.

As the body 892 of elastomeric material expands in a radial direction, the cylindrical inner side surface 904 on the body 892 of elastomeric material applies force against fluid in the secondary chamber 894. This force induces the fluid in the secondary chamber to flow through the passages 950 into the main chamber 860. When the flange members 850 at the head end portion 838 of the piston 826 engage the stop surface 886, upward (as viewed in FIG. 21) movement of the force transmitting member 898 is interrupted with the cushion assembly 820 in a fully extended condition.

At this time, the size of the secondary chamber 894 will have been reduced from the relatively large size illustrated in FIG. 22 to the relatively small size illustrated in FIG. 21. As was previously mentioned, the cylindrical outer size surface 904 on the body 892 of elastomeric material is spaced from the cylindrical inner side surface 856 of the cylinder 824 so that the body of elastomeric material does not apply force against the cylinder.

The force transmitting or wall member 898 is disposed between a flange 924 on the stop member 884 and the body 892 of elastomeric material. In order to enable the flange 922 on the force transmitting member 898 to be positioned on the stop member 884 (FIGS. 21 and 22), the annular force transmitting member 898 is broken. The radially extending break in the annular force transmitting member enables the inner force transmitting member to be resiliently deflected and snapped over the flange 924 on the stop member 884.

To enable a break to be formed at a desired location in the force transmitting member 898, a radially extending cut 960 (FIG. 25) is made at the location where the force transmitting member is to be broken. The cut 960 extends between a cylindrical radially outer surface 964 on the force transmitting member 898 and a cylindrical inner surface 966 on the force transmitting member. In the specific embodiment illustrated in FIG. 25, the cut 960 is aligned with one of the passages 950. However, if desired, the cut 960 could be disposed at a location of the force transmitting member 898 other than in alignment with the passage 950.

Although the cut 960 extends between the radially outer and inner surfaces 964 and 966 on the force transmitting member 898, the cut does not extend between the axially opposite side surfaces 954 and 956 on the force transmitting member 898. Thus, the cut 960 extends only part way between the axially opposite side surfaces 954 and 956 on the force transmitting member 898. A small bridging body of material 968 (FIG. 25) is left.

The bridging body 968 of material is subsequently broken along a break line which has been indicated schematically at 970 in FIG. 24. The break line 970 results in the force transmitting member 898 having broken end portions 974 and 976 disposed on opposite sides of the break line 970. By applying force directed in opposite directions along the central axis of the inner force transmitting member 898, the force transmitting member can be resiliently deflected and broken end portions 974 and 976 axially offset relative to each other. The resiliently deflected force transmitting member 898 with the broken end portions 974 and 976 axially offset can be snapped over the flange 924 (FIG. 21) on the stop member 894. This enables the force transmitting member 898 to be positioned on the stop member.

Upon interruption of the axial force to the broken end portions 974 and 976 of the force transmitting member 898, the force transmitting member moves back to the position shown in FIG. 24. As this occurs, the broken end portions 974 and 976 of the force transmitting member 898 engage each other. The natural resilience of the force transmitting member 898 causes the two broken end portions 974 and 976 to be pressed against each other.

The broken surfaces on the end portions 974 and 976 mate perfectly with each other along the break line 970. This results in the force transmitting member 898 having a smooth, continuous upper side surface 956 which does not unduly wear the body 892 of elastomeric material during operation of the cushion assembly 820.

Rather than breaking the force transmitting member 898 along the break line 970, the force transmitting member could be formed in a different manner if desired. For example, the force transmitting member 898 could be formed by two separate semi-circular members which are interconnected. Alternatively, the force transmitting member 898 could be resiliently expanded to clear the flange 924. If desired, the force transmitting member 898 could be positioned on the stop member 884 and the flange 924 subsequently formed on the stop member. If desired, the flange 924 could be releasably connected with the stop member 884.

In the embodiment of the invention illustrated in FIGS. 16–20, the force transmitting member 698 is formed of metal. In the embodiment of the invention illustrated in FIGS. 21–25, the force transmitting member 898 may formed of a suitable polymeric material. The force transmitting member 898 made be formed of an acetal resin, such as "Delrin" (trademark). However, it should be understood that the force transmitting member 898 could be formed of other materials if desired.

The cushion assembly 820 and the body 892 of elastomeric material have the same dimensions and operating characteristics as previously mentioned in conjunction with the embodiment of the invention illustrated in FIGS. 16–20. Thus, the fluid pressure in the main chamber 860 is at least seven hundred pounds per square inch (700 psi) and is less than two thousand seven hundred pounds per square inch (2,700 psi) when the cushion assembly 820 is in the extended condition. The body 892 of elastomeric material has the same composition, dimensions, operating characteristics, and range of movement as the body of elastomeric material 692 of FIGS. 16–20. In fact, the body 892 of elastomeric material is identical to the body 692 of elastomeric material and functions in the same manner.

In the embodiment of the force transmitting member 898 illustrated in FIGS. 21–25, the force transmitting member is formed with passages 950 through which fluid flows conducted between the main chamber 860 and the secondary chamber 894. In the embodiment of the invention illustrated in FIGS. 26–28, the force transmitting member 990 has the same general construction as the force transmitting member 898 and the force transmitting member 698.

Figure 26:
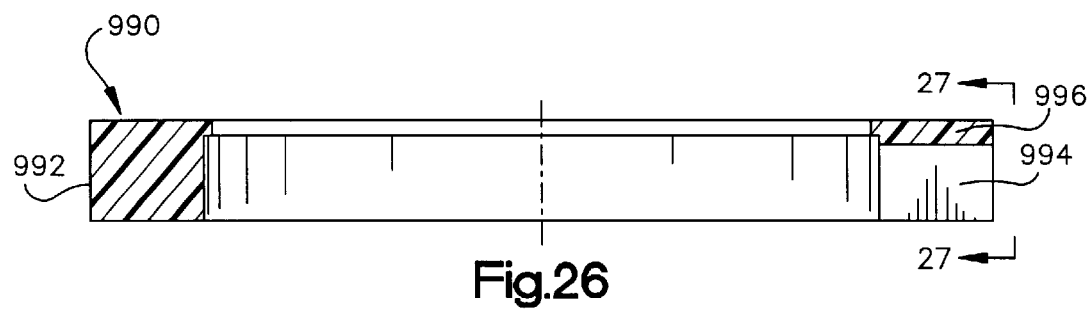
FIG. 26 is a side sectional view of a second embodiment of the force transmitting member of FIG. 23.
Figure 27:
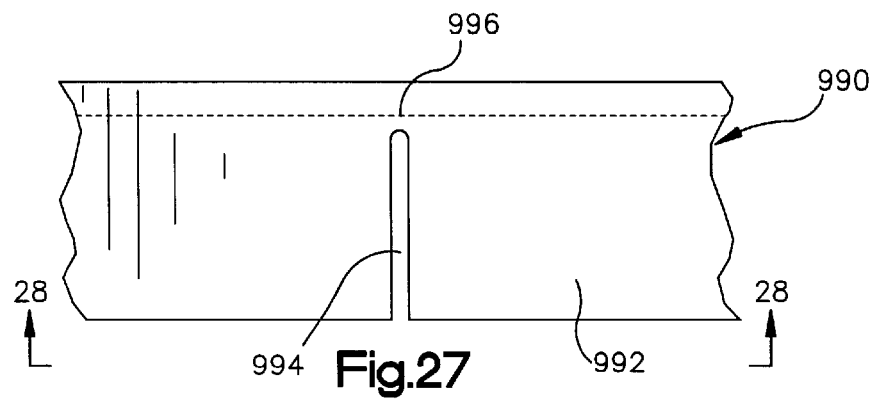
FIG. 27 is a plan view, taken generally along the line 27—27 of FIG. 26.
Figure 28:
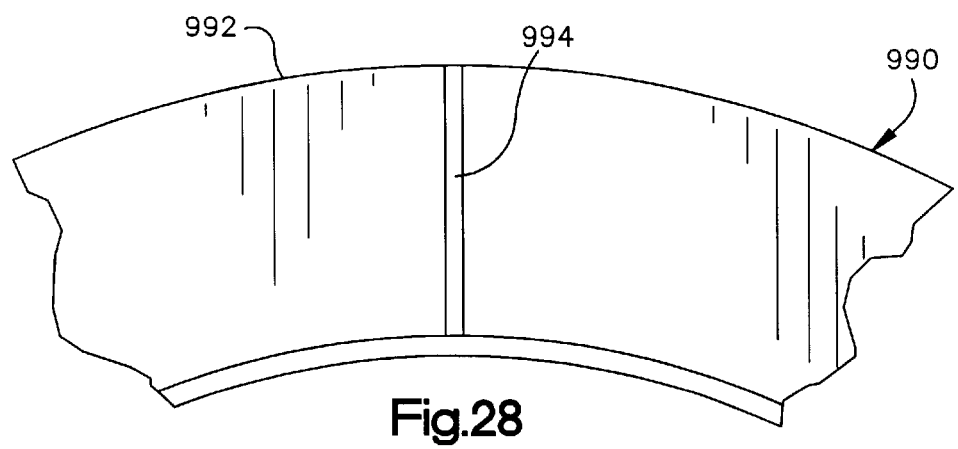
FIG. 28 is a fragmentary view, taken generally along line 28—28 of FIG. 27.

In the embodiment of the invention illustrated in FIGS. 26–28, the force transmitting member 990 is formed with a smooth, continuous outer surface 992. Thus, the force transmitting member 990 does not have passages, corresponding to the passages 950 in the force transmitting member 898. A cut 994 (FIGS. 26–28) is formed in the force transmitting member 990. Although the cut 994 extends radially through the force transmitting member 990, the cut 994 does not extend axially through the force transmitting member. A bridging body 996 is broken in the same manner as previously described in conjunction with the bridging body 968 of material of FIG. 25. This results in the formation of a break line, corresponding to the break line 970 of FIG. 24. The force transmitting member 990 can be resiliently deflected by applying force to the portions of the force transmitting member on opposite sides of the break line to enable the force transmitting member to be snapped into place on a stop member, corresponding to the stop member 884 of FIG. 21.

The smooth cylindrical outer side surface 992 of the force transmitting member 990 has a diameter which is less than the inside diameter of a cylindrical side surface 856 on the cylinder 824. Specifically, the cylindrical outer side surface 992 of the force transmitting member 990 has a diameter which is between 0.002 to 0.030 inches smaller than the inside diameter of a cylinder with which the force transmitting member 990 is to be associated. By having the outside diameter of the force transmitting member 990 less than the inside diameter of the cylinder in which the force transmitting member is to be disposed, fluid can flow between the main and secondary chambers, i.e., between the chamber corresponding to the main chamber 860 of FIG. 21 and the secondary chamber 894, along the outer side surface 992 of the force transmitting member 990 during operation of a cushion assembly.

It is contemplated that the force transmitting member 990 could be constructed with an outside diameter such that the surface 992 of the force transmitting members slidably engages the inner side surface of a cylinder in which the force transmitting member is disposed. This would result in a flow of gas between the main chamber, corresponding to the chamber 860 of FIG. 21, and the secondary chamber corresponding to the chamber 894 of FIG. 21, being partially blocked by the force transmitting member 990. To facilitate a flow of gas between the chambers, passages may be formed in the force transmitting member 990. These passages may be disposed at the periphery of the force transmitting member 990 in the manner illustrated in FIGS. 23–25. Alternatively, the passages may be formed through the body of the force transmitting member if desired. It is contemplated that both radially and/or axially extending passages could be formed in the force transmitting member 990.

Thus, from the foregoing discussion, it is apparent that the present invention solves many of the problems encountered when using conventional gas spring arrangements. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

Having described the invention, the following is claimed:

1. A method comprising the steps of operating a press assembly between open and closed conditions to deform a workpiece, said steps of operating a press assembly between open and closed conditions includes operating a cushion assembly from an extended condition to a retracted condition against the influence of fluid pressure in the cushion assembly and operating the cushion assembly from the retracted condition to the extended condition, said step of operating the cushion assembly from the retracted condition to the extended condition includes establishing relative movement between a piston and cylinder in the cushion assembly under the influence of fluid pressure in a main chamber in the cylinder of the cushion assembly, said step of operating the cushion assembly from the extended condition to the retracted condition includes transmitting force from a body of elastomeric material to the piston and initiating movement of the piston relative to the cylinder toward the retracted condition under the combined influence of force transmitted from the press assembly to the piston and force transmitted from the body of elastomeric material to the piston.

2. A method as set forth in claim 1 wherein force transmitted between the body of elastomeric material and the piston when the cushion assembly is in the extended condition has a magnitude which is at least as great as thirty-five percent (35%) of the magnitude of force transmitted to the piston from fluid in the chamber of the cylinder when the cushion assembly is in the extended condition.

3. A method as set forth in claim 2 further including the step of urging the piston toward the body of elastomeric material under the influence of a fluid pressure of at least seven hundred pounds per square inch (700 psi) when the cushion assembly is in the extended condition.

4. A method as set forth in claim 1 further including the steps of limiting relative movement between the piston and the cylinder when the cushion assembly is in the extended condition by transmitting force between a stop surface and the piston when the cushion assembly is in the extended condition, and urging the piston away from the stop surface toward the retracted condition when the cushion assembly is in the extended condition under the influence of force transmitted from the body of elastomeric material, interrupting the transmission of force from the body of elastomeric material to the piston when the piston has moved relative to the cylinder from an extended condition through a predetermined distance toward the retracted condition, and, thereafter, continuing movement of the piston relative to the cylinder toward the retracted condition under the influence of force transmitted to the piston from the press assembly.

5. A method as set forth in claim 4 wherein said step of transmitting force between a stop surface and the piston when the cushion assembly is in the extended condition includes pressing a first surface area on a head end portion of the piston against the stop surface under the influence of fluid pressure in the chamber of the cylinder, said step of transmitting force from a body of elastomeric material to the piston includes pressing a force transmitting member against a second surface area on the head end portion of the piston under the influence of force transmitted from the body of elastomeric material to the force transmitting member.

6. A method as set forth in claim 4 further including the step of urging the piston toward the stop surface and body of elastomeric material under the influence of a fluid pressure of less than two thousand seven hundred pounds (2,700 psi) when the cushion assembly is in the extended condition.

7. A method as set forth in claim 4 wherein the force transmitted from the body of elastomeric material to the piston has a magnitude of thirty-five to eighty percent (35% to 80%) of the magnitude of force transmitted to the piston from fluid in the chamber of the cylinder when the cushion assembly is in the extended condition.

8. A method as set forth in claim 7 further including the step of urging the piston toward the stop surface and body of elastomeric material under the influence of a fluid pressure of between seven hundred and two thousand seven hundred pounds per square inch (700 and 2,700 psi) when the cushion assembly is in the extended condition.

9. A method as set forth in claim 1 wherein force is transmitted to the piston from the body of elastomeric material during at least three percent (3%) of the movement of the piston relative to the cylinder during operation of the cushion assembly from the extended condition to the retracted condition.

10. A method as set forth in claim 1 wherein force is transmitted to the piston from the body of elastomeric material during less than fifty percent (50%) of the movement of the piston relative to the cylinder during operation of the cushion assembly from the extended condition to the retracted condition.

11. A method as set forth in claim 1 wherein force is transmitted to the piston from the body of elastomeric material a distance of between three and fifty percent (3 and 50%) of the movement of the piston relative to the cylinder during operation of the cushion assembly from the extended condition to the retracted condition.

12. A method as set forth in claim 1 wherein force is transmitted between the piston and a stop surface along a first path of force transmission when the cushion assembly is in the extended condition and is transmitted between the piston and body of elastomeric material along a second path of force transmission when the cushion assembly is in the extended condition.

13. A method as set forth in claim 1 wherein said step of initiating movement of the piston relative to the cylinder toward the retracted position includes expanding the body of elastomeric material in a direction of movement of the piston toward the retracted condition and contracting the body of elastomeric material in a direction transverse to the direction of movement of the piston toward the retracted position to thereby maintain the volume of the body of elastomeric material substantially constant during operation of the cushion assembly from the extended condition to the retracted condition.

14. A method as set forth in claim 1 wherein said step of operating the cushion assembly from the extended condition to the retracted condition includes increasing the length of the body of elastomeric material, as measured along a longitudinal central axis of the piston, by a distance which is at least as great as twenty percent (20%) of the length of said body of elastomeric material when the cushion assembly is in the retracted condition.

15. A method as set forth in claim 1 wherein said step of operating the cushion assembly from the extended condition to the retracted condition includes increasing the length of the body of elastomeric material, as measured along a longitudinal central axis of the piston, by a distance which is at least as great as thirty-five percent (35%) of the length of said body of elastomeric material when the cushion assembly is in the retracted condition.

16. A method as set forth in claim 1 wherein said step of operating the cushion assembly from the extended condition to the retracted condition includes increasing the length of the body of elastomeric material as measured along a longitudinal central axis of the piston by a distance which is at least as great as thirty-five to forty-five percent (35–45%) of the length of said body of elastomeric material when the cushion assembly is in the retracted condition.

17. A method as set forth in claim 1 wherein said step of operating the cushion assembly from the extended condition to the retracted condition includes increasing the length of the body of elastomeric material, as measured along a longitudinal central axis of the piston, from a length of between 0.400 inches and 1.000 inches to a length of between 0.600 inches and 1.500 inches.

18. A method as set forth in claim 1 wherein the body of elastomeric material has an annular cross sectional configuration as viewed in a plane extending perpendicular to a longitudinal central axis of said piston, said step of operating the cushion assembly from the extended condition to the retracted condition includes maintaining an inside diameter of said body of elastomeric material substantially constant and decreasing an outside diameter of said body of elastomeric material.

19. A method as set forth in claim 1 wherein the piston includes a head end portion and a rod portion, said step of operating the cushion assembly from the retracted condition to the extended condition and said step of operating the cushion assembly from the extended condition to the retracted condition includes maintaining the body of elastomeric material spaced from the rod portion of the piston.

20. A method as set forth in claim 1 wherein the piston includes a head end portion and a rod portion, said step of operating the cushion assembly from the retractor condition to the extended condition includes moving the head end portion of the piston into engagement with the body of elastomeric material.

21. A method as set forth in claim 20 further including the step of maintaining the body of elastomeric material spaced from the rod portion of said piston during operation of said cushion assembly between the extended and retracted conditions.

22. A method as set forth in claim 1 wherein the body of elastomeric material is disposed in a secondary chamber, said step of operating the cushion assembly from the extended condition to the retracted condition includes increasing the volume of the secondary chamber and conducting a flow of fluid from the main chamber of the piston and cylinder assembly into the secondary chamber, said step of operating the cushion assembly from the retracted condition to the extended condition includes conducting a flow of fluid from the secondary chamber to the main chamber.

23. A method as set forth in claim 22 further including the step of maintaining a volume of space occupied by the body of elastomeric material substantially constant as the volume of the secondary chamber increases during operation of the cushion assembly from the extended condition to the retracted condition and as the volume of the secondary chamber decreases during operation of the cushion assembly from the retracted condition to the extended condition.

24. A method as set forth in claim 22 wherein the secondary chamber is partially defined by an end wall having a circular radially outer side surface and a circular inner side surface of the cylinder which has a diameter which exceeds a diameter of the circular radially outer side surface of the end wall by a distance of 0.002 to 0.030 inches, said step of conducting a flow of fluid from the secondary chamber to the main chamber includes conducting the flow of fluid through space between the outer side surface of the end wall and the inner side surface of the cylinder.

25. A method as set forth in claim 22 wherein the secondary chamber is partially defined by an end wall having a peripheral portion which is disposed adjacent to an inner side surface of the cylinder, the peripheral portion of the end wall at least partially defines a plurality of recesses, said step of conducting a flow of fluid from the secondary chamber to the main chamber includes conducting the flow of fluid through the recesses in the peripheral portion of the end wall.

26. A method as set forth in claim 22 wherein the secondary chamber is partially defined by an end wall, said step of conducting a flow of fluid from the secondary chamber to the main chamber includes conducting fluid through a passage which is at least partially formed in said end wall.

27. A method as set forth in claim 1 wherein said step of operating the cushion assembly from the retracted condition to the extended condition includes moving a head end portion of the piston into engagement with the body of elastomeric material, transmitting force from the head end portion of the piston to the body of elastomeric material, engaging a stop surface with the head end portion of the piston to limit movement of the piston, and, thereafter, transmitting force from the head end portion of the piston to both the body of elastomeric material and the stop surface.

28. A method as set forth in claim 1 wherein said step of operating the cushion assembly from the retracted condition to the extended condition includes moving a head end portion of the piston into engagement with a force transmitting member, transmitting force from the head end portion of the piston to the body of elastomeric material through the force transmitting member, engaging a stop surface with the head end portion of the piston to limit movement of the piston, and, thereafter, transmitting force from the head end portion of the piston to both the body of elastomeric material and the stop surface.

29. A method as set forth in claim 1 wherein said step of operating the cushion assembly from the extended condition to the retracted condition includes moving a head end portion of the piston out of engagement with a stop surface while the body of elastomeric material is disposed in engagement with the piston, and, thereafter, moving the head end portion of the piston out of engagement with the body of elastomeric material.

30. A method as set forth in claim 1 wherein said step of operating said cushion assembly from the extended condition to the retracted condition includes moving a head end portion of the piston out of engagement with a stop surface while pressing a force transmitting member against the head end portion of the piston under the influence of force transmitted from the body of elastomeric material to the force transmitting member, and, thereafter, moving the head end portion of the piston out of engagement with the force transmitting member.

31. A method as set forth in claim 1 further including the step of transmitting force from the body of elastomeric material to an outer side of a tubular element which extends around a rod portion of the piston when the cushion assembly is in the extended condition, said step of operating the cushion assembly from the extended condition to the retracted condition includes moving a rod portion of the piston along an inner side of the tubular element and decreasing the force transmitted from the body of elastomeric material to the outer side of the tubular element.

32. A method as set forth in claim 31 further including the step of transmitting force from a head end portion of the piston to the tubular element when the cushion assembly is in the extended condition, and interrupting transmission of force from the head end portion of the piston to the tubular element upon initiation of movement of the piston toward the retracted position.

33. A method as set forth in claim 1 further including said step of operating the cushion assembly from the extended condition to the retracted condition includes increasing fluid pressure in the main chamber from a pressure which is at least seven hundred pounds per square inch (700 psi) to a fluid pressure which is less than two thousand seven hundred pounds per square inch (2,700 psi).

34. A method as set forth in claim 1 wherein said step of operating the cushion assembly from the retracted condition to the extended condition includes contracting the body of elastomeric material in a direction extending along a longitudinal central axis of the piston and expanding the body of elastomeric material in a direction transverse to the longitudinal central axis of the piston while maintaining the body of elastomeric material spaced from a rod portion of the piston and from a cylindrical inner side surface of the cylinder.

35. A method as set forth in claim 1 wherein said step of operating the cushion assembly from the retracted condition to the extended condition includes moving a head end portion of the piston toward one end of the cylinder, resiliently deflecting the body of elastomeric material during movement of the head end portion of the piston toward the one end of the cylinder and stopping movement of the head end portion of the piston toward the one end of the cylinder when the piston is in a predetermined position relative to the cylinder to limit the extent of deflection of the body of elastomeric material.

36. A method as set forth in claim 35 wherein the body of elastomeric material is disposed adjacent a rod portion of the piston which extends from the head end portion of the piston through the one end of the cylinder when the cushion assembly is in the extended condition, said step of deflecting the body of elastomeric material is performed with the body of elastomeric material spaced from the rod portion of the piston.

37. A method as set forth in claim 35 wherein said step of stopping movement of the head end portion of the piston toward the one end of the cylinder includes moving the head end portion of the piston into engagement with a stop surface.

38. A method as set forth in claim 1 wherein said step of operating the cushion assembly from the extended condition to the retracted condition includes moving a head end portion of the piston out of engagement with a stop surface under the combined influence of force transmitted from the press assembly and the body of elastomeric material to the piston, resiliently expanding the body of elastomeric material in a direction of movement of the head end portion of the piston away from the stop surface, and stopping transmission of force from the body of elastomeric material to the piston upon movement of the head end portion of the piston to a predetermined position relative to the cylinder.

39. A method as set forth in claim 1 wherein said step of operating the cushion assembly from the extended condition to the retracted condition includes contracting the body of elastomeric material in a direction transverse to a direction of movement of the piston and conducting a flow of fluid through a passage which is at least partially formed in a member disposed at one end of the body of elastomeric material into a space which increases in size as the body of elastomeric material contracts in the direction transverse to the direction of movement of the piston.

40. A method as set forth in claim 39 wherein said step of conducting a flow of fluid through the passage includes inducing fluid flow through the passage under the influence of fluid pressure on a side of the member spaced from the body of elastomeric material.

41. A method as set forth in claim 1 wherein said step of operating the cushion assembly from the retracted condition to the extended condition includes expanding the body of elastomeric material in a direction transverse to a direction of movement of the piston and conducting a flow of fluid from a space which decreases in sizes as the body of elastomeric material expands through a passage which is at least partially formed by a member disposed at one end of the body of elastomeric material.

42. A method as set forth in claim 41 wherein said step of conducting a flow of fluid form a space which decreases in size includes inducing fluid flow through the passage under the influence of force transmitted to fluid in the space which decreases in size by the body of elastomeric material.

43. A method comprising the steps of operating a press assembly between open and closed conditions to deform a workpiece, said steps of operating a press assembly between open and closed conditions includes operating a cushion assembly from an extended condition to a retracted condition against the influence of fluid pressure in the cushion assembly and operating the cushion assembly from the retracted condition to the extended condition, said step of operating the cushion assembly from the retracted condition to the extended condition includes establishing relative movement between a piston and cylinder in the cushion assembly under the influence of fluid pressure in a chamber in the cylinder of the cushion assembly, limiting relative movement between the piston and cylinder when the cushion assembly is in the extended condition by transmitting force between a stop surface and a first surface area on a head end portion of the piston, urging the head end portion of the piston away from the stop surface toward a retracted condition when the cushion assembly is in the extended condition by applying a biasing force against a second surface area on the head end portion of the piston when the cushion assembly is in the extended condition, said step of operating the cushion assembly from the extended condition to the retracted condition includes initiating movement of the piston toward the retracted condition under the combined influence of force transmitted from the press assembly to the piston and the biasing force, interrupting the application of the biasing force to the piston when the piston has moved from the extended condition through a predetermined distance toward the retracted condition, and, thereafter, continuing movement of the piston toward the retracted condition under the influence of force transmitted to the piston from the press assembly.

44. A method as set forth in claim 43 wherein the first surface area on the head end portion of the piston has an annular configuration, said step of applying a biasing force against a second surface area on the head end portion of the piston includes applying the biasing force against a surface area on the head end portion of the piston which is radially offset from the first surface area.

45. A method as set forth in claim 43 wherein the biasing force applied against the second surface area on the head end portion of the piston has a magnitude which is at least as great as thirty-five percent (35%) of the magnitude of force transmitted to the piston from fluid in the chamber of the cylinder when the cushion assembly is in the extended condition.

46. A method as set forth in claim 43 further including the step of urging the head end portion of the piston toward the stop surface under the influence of a fluid pressure of at least seven hundred pounds per square inch (700 psi) when the cushion assembly is in the extended condition.

47. A method as set forth in claim 43 wherein the biasing force applied against the second surface area on the head end portion of the piston as a magnitude of thirty-five to eighty percent (35 to 80%) of the magnitude of force transmitted to the piston from fluid in the chamber of the cylinder when the cushion assembly is in the extended condition.

48. A method as set forth in claim 47 wherein the step of urging the head end portion of the piston toward the stop surface under the influence of a fluid pressure of between seven hundred and two thousand seven hundred pounds per square inch (700 and 2,700 psi) when the cushion assembly is in the extended condition.

49. A method as set forth in claim 43 wherein said step of applying a biasing force against a second surface area on the head end portion of the piston when the cushion assembly is in the extended condition includes transmitting force between a body of elastomeric material and the head end portion of the piston.

50. A method as set forth in claim 49 wherein said step of transmitting force between a body of elastomeric material and the head end portion of the piston includes engaging the second surface area on the head end portion of the piston with the body of elastomeric material.

51. A method as set forth in claim 50 wherein said step of engaging the second surface area on the head end portion of the piston with the body of elastomeric material includes maintaining the body of elastomeric material in engagement with the second surface area on the head end portion of the piston during at least three percent (3%) of the movement of the piston relative to the cylinder during operation of the cushion assembly from the extended condition to the retracted condition.

52. A method as set forth in claim 43 wherein said step of applying a biasing force against a second surface area on the head end portion of the piston includes pressing a force transmitting member against the second surface area on the head end portion of the piston under the influence of force transmitted from a body of elastomeric material.

53. A method as set forth in claim 52 wherein said step of pressing the force transmitting member against the second surface area on the head end portion of the piston is performed during at least three percent (3%) of the movement of the piston relative to the cylinder during operation of the cushion assembly from the extended condition to the retracted condition.

54. A method comprising the steps of operating a press assembly between open and closed conditions to deform a workpiece, said steps of operating a press assembly between open and closed conditions includes operating a cushion assembly from an extended condition to a retracted condition against the influence of fluid pressure in the cushion assembly and operating the cushion assembly from the retracted condition to the extended condition, said step of operating the cushion assembly from the extended condition to the retracted condition includes moving a rod portion of a piston along an inner surface of a tubular element under the combined influence of force transmitted from a body of elastomeric material to the piston and force transmitted from the press assembly to the piston to compress fluid in a cylinder in which at least a portion of the piston is disposed, said step of operating the cushion assembly from the extended condition to the retracted condition includes moving at least a portion of a surface on the body of elastomeric material along an outer surface of the tubular element during movement of the rod portion of the piston along the inner surface of the tubular element.

55. A method as set forth in claim 54 wherein said step of operating the cushion assembly from the extended condition to the retracted condition includes maintaining the body of elastomeric material and the piston in a spaced apart relationship during at least a portion of movement of the rod portion of the piston along the inner surface of the tubular element.

56. A method as set forth in claim 54 wherein said step of moving the rod portion of the piston along an inner surface of the tubular element under the combined influence of force transmitted from the body of elastomeric material to the piston and force transmitted from the press assembly to the piston includes transmitting force from the body of elastomeric material to the piston through a force transmitting member which extends around the tubular element.

57. A method as set forth in claim 54 wherein said step of operating the cushion assembly from the retracted condition to the extended condition includes moving a surface connected with the piston into engagement with an end portion of the tubular element to block movement of the piston relative to the tubular element.

58. A method as set forth in claim 54 wherein said step of moving the rod portion of the piston along an inner surface of the tubular element under the combined influence of force transmitted from the body of elastomeric material to the piston and force transmitted from the press assembly to the piston includes transmitting force from the body of elastomeric material to the piston through a force transmitting member and engaging an end portion of the tubular element with the force transmitting member to interrupt the transmission of force from the body of elastomeric material to the piston.

59. A method as set forth in claim 54 wherein said step of operating the cushion assembly from the extended condition to the retracted condition includes moving at least a portion of a surface on the body of elastomeric material away from an inner surface of the cylinder toward the tubular element.

60. A method as set forth in claim 54 further including the step of conducting a flow of fluid along a path disposed between the body of elastomeric material and a head end portion of the piston during operation of the cushion assembly between the retracted and extended conditions.

61. A method as set forth in claim 54 further including the step of conducting a flow of fluid away from an outer surface of the body of elastomeric material during operation of the cushion assembly from the retracted condition to the extended condition.

62. A method as set forth in claim 54 further including the step of conducting a flow of fluid in a direction toward an outer surface of the body of elastomeric material during operation of the cushion assembly from the extended condition to the retracted condition.

63. A method as set forth in claim 54 wherein said step of moving the surface on the body of elastomeric material along the outer surface of the tubular element occurs during at least three percent (3%) of the movement of the rod portion of the piston along the inner surface of the tubular element during operation of the cushion assembly from the extended condition to the retracted condition.

64. A method as set forth in claim 63 wherein said step of moving the surface on the step of moving the surface on the body of elastomeric material along the outer surface of the tubular element occurs during less than fifty percent (50%) of the movement of the rod portion of the piston along the inner surface of the tubular element during operation of the cushion assembly from the extended condition to the retracted condition.

65. A method as set forth in claim 54 wherein said step of moving the surface on the body of elastomeric material along the outer surface of the tubular element occurs through a distance along the outer surface of the tubular element which is at least as great as twenty percent (20%) of a distance along the surface of the tubular element along which the body of elastomeric material extends when the cushion assembly is in the retracted condition.

66. A method as set forth in claim 54 wherein said step of operating moving the surface on the body of elastomeric material along an outer surface of the tubular element includes increasing a distance which the body of elastomeric material extends along the surface of the tubular from a distance of between 0.400 inches and 1.00 inches to a length of between 0.600 inches and 1.500 inches.

* * * * *